United States Patent
Hori et al.

(10) Patent No.: US 7,999,534 B2
(45) Date of Patent: Aug. 16, 2011

(54) ROTATION SENSOR WITH DETECTION SIGNAL TIMING CYCLE FEATURES

(75) Inventors: Shinji Hori, Tokyo (JP); Shinichiro Iizuka, Tokyo (JP); Tomoaki Toratani, Tokyo (JP); Shinya Saito, Tokyo (JP); Kousuke Yamawaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 846 days.

(21) Appl. No.: 11/814,727

(22) PCT Filed: Jan. 25, 2006

(86) PCT No.: PCT/JP2006/301095
§ 371 (c)(1),
(2), (4) Date: Oct. 9, 2007

(87) PCT Pub. No.: WO2006/080325
PCT Pub. Date: Aug. 3, 2006

(65) Prior Publication Data
US 2009/0219014 A1    Sep. 3, 2009

(30) Foreign Application Priority Data

Jan. 25, 2005 (JP) ................. 2005-017211
Jan. 25, 2005 (JP) ................. 2005-017529
Jun. 16, 2005 (JP) ................. 2005-177037
Jul. 1, 2005 (JP) ................. 2005-194448
Jan. 24, 2006 (JP) ................. 2006-015657

(51) Int. Cl.
*G01B 7/30* (2006.01)

(52) U.S. Cl. ............... 324/207.16; 324/207.25

(58) Field of Classification Search .......... None
See application file for complete search history.

(56) References Cited

U.S. PATENT DOCUMENTS 5,481,188 A * 1/1996 Mizutani ............... 324/207.25
7,358,719 B2 * 4/2008 Kondo ................. 324/207.25

FOREIGN PATENT DOCUMENTS

| JP | 61 281853    | 12/1986 |
|----|--------------|---------|
| JP | 4 236323     | 8/1992  |
| JP | 6 26808      | 2/1994  |
| JP | 2001-505667  | 4/2001  |
| JP | 2002 357494  | 12/2002 |
| JP | 2003-202240  | 7/2003  |
| JP | 2003-344009  | 12/2003 |
| JP | 2003 344009  | 12/2003 |
| JP | 2004-170273  | 6/2004  |
| JP | 2004 317312  | 11/2004 |

* cited by examiner

*Primary Examiner* — Jay M Patidar
(74) *Attorney, Agent, or Firm* — Oblon, Spivak, McClelland, Maier & Neustadt, L.L.P.

(57) ABSTRACT

A rotation sensor including: a main rotor that integrally rotates with a rotor to be measured; a sub-rotor that rotates in accordance with rotation of the main rotor with a different number of revolutions from that of the main rotor; a first detector detecting rotation of the main rotor; and a second detector detecting rotation of the sub-rotor. The rotation sensor detects an absolute rotation angle of the rotor to be measured from detection signals from the first detector and the second detector. Respective detection signals obtained from the first detector and the second detector are cyclically output in accordance with rotation of each rotor, and the following relationship is satisfied:

$(Tm-Tc \times i) \times n = Tm$ (i and n are positive integers), wherein Tc is a cycle of the detection signal from the first detector, and Tm is a cycle of the detection signal from the second detector.

8 Claims, 21 Drawing Sheets

(a)

(b)

RELATIONSHIP BETWEEN SMALL STEERING ANGLE, LARGE STEERING ANGLE, AND ABSOLUTE STEERING ANGLE (IN ORDER OF ABSOLUTE ANGLE)

| SMALL STEERING ANGLE [deg] | LARGE STEERING ANGLE [deg] | ABSOLUTE ANGLE [deg] | SMALL STEERING ANGLE [deg] | LARGE STEERING ANGLE [deg] | ABSOLUTE ANGLE [deg] | SMALL STEERING ANGLE [deg] | LARGE STEERING ANGLE [deg] | ABSOLUTE ANGLE [deg] |
|---|---|---|---|---|---|---|---|---|
| 44 | -46 | -1576 | 45 | -45 | -1575 | 46 | -44 | -1574 |
| 44 | 44 | -1486 | 45 | 45 | -1485 | 46 | 46 | -1484 |
| 44 | -57.25 | -1396 | 45 | -56.25 | -1395 | 46 | -55.25 | -1394 |
| 44 | 32.75 | -1306 | 45 | 33.75 | -1305 | 46 | 34.75 | -1304 |
| 44 | -68.5 | -1216 | 45 | -67.5 | -1215 | 46 | -66.5 | -1214 |
| 44 | 21.5 | -1126 | 45 | 22.5 | -1125 | 46 | 23.5 | -1124 |
| 44 | -79.75 | -1036 | 45 | -78.75 | -1035 | 46 | -77.75 | -1034 |
| 44 | 10.25 | -946 | 45 | 11.25 | -945 | 46 | 12.25 | -944 |
| 44 | -91 | -856 | 45 | -90 | -855 | 46 | -89 | -854 |
| 44 | -1 | -766 | 45 | 0 | -765 | 46 | 1 | -764 |
| 44 | 89 | -676 | 45 | 90 | -675 | 46 | 91 | -674 |
| 44 | -12.25 | -586 | 45 | -11.25 | -585 | 46 | -10.25 | -584 |
| 44 | 77.75 | -496 | 45 | 78.75 | -495 | 46 | 79.75 | -494 |
| 44 | -23.5 | -406 | 45 | -22.5 | -405 | 46 | -21.5 | -404 |
| 44 | 66.5 | -316 | 45 | 67.5 | -315 | 46 | 68.5 | -314 |
| 44 | -34.75 | -226 | 45 | -33.75 | -225 | 46 | -32.75 | -224 |
| 44 | 55.25 | -136 | 45 | 56.25 | -135 | 46 | 57.25 | -134 |
| 44 | -46 | -46 | 45 | -45 | -45 | 46 | -44 | -44 |
| 44 | 44 | 44 | 45 | 45 | 45 | 46 | 46 | 46 |
| 44 | -57.25 | 134 | 45 | -56.25 | 135 | 46 | -55.25 | 136 |
| 44 | 32.75 | 224 | 45 | 33.75 | 225 | 46 | 34.75 | 226 |
| 44 | -68.5 | 314 | 45 | -67.5 | 315 | 46 | -66.5 | 316 |
| 44 | 21.5 | 404 | 45 | 22.5 | 405 | 46 | 23.5 | 406 |
| 44 | -79.75 | 494 | 45 | -78.75 | 495 | 46 | -77.75 | 496 |
| 44 | 10.25 | 584 | 45 | 11.25 | 585 | 46 | 12.25 | 586 |
| 44 | -91 | 674 | 45 | -90 | 675 | 46 | -89 | 676 |
| 44 | -1 | 764 | 45 | 0 | 765 | 46 | 1 | 766 |
| 44 | 89 | 854 | 45 | 90 | 855 | 46 | 91 | 856 |
| 44 | -12.25 | 944 | 45 | -11.25 | 945 | 46 | -10.25 | 946 |
| 44 | 77.75 | 1034 | 45 | 78.75 | 1035 | 46 | 79.75 | 1036 |
| 44 | -23.5 | 1124 | 45 | -22.5 | 1125 | 46 | -21.5 | 1126 |
| 44 | 66.5 | 1214 | 45 | 67.5 | 1215 | 46 | 68.5 | 1216 |
| 44 | -34.75 | 1304 | 45 | -33.75 | 1305 | 46 | -32.75 | 1306 |
| 44 | 55.25 | 1394 | 45 | 56.25 | 1395 | 46 | 57.25 | 1396 |
| 44 | -46 | 1484 | 45 | -45 | 1485 | 46 | -44 | 1486 |
| 44 | 44 | 1574 | 45 | 45 | 1575 | 46 | 46 | 1576 |

ROTATION SENSOR WITH DETECTION SIGNAL TIMING CYCLE FEATURES

TECHNICAL FIELD

The present invention relates to a rotation sensor which is disposed to a rotor to detect a rotation angle of the rotor.

BACKGROUND ART

A so-called rotation sensor which is disposed to a rotating shaft, e.g., a steering shaft in a car to detect a rotation angle of a steering wheel integrated with the shaft is used (see, e.g., Patent Document 1 and Patent Document 2).

The rotation sensor disclosed in Patent Document 1 is a rotation sensor which measures a rotation angle of a main rotor which rotates in cooperation with two sub-rotors, the main rotor includes a gear, and each of the two sub-rotors also includes a gear. It is to be noted that the number of teeth of the gear in the main rotor is different from that of the gear in each of the sub-rotors, the gear in the main rotor meshes with the gear in one sub-rotor, and the gear in the main rotor meshes with the gear of the other sub-rotor. Further, each of the sub-rotors includes a magnet, and two AMR sensors which detect magnetic fluxes of the respective magnets are provided in a fixing portion of the rotation sensor.

Furthermore, an absolute rotation angle of the main rotor is calculated by utilizing, e.g., a phase difference between detection output values having different phases obtained from the two AMR sensors.

On the other hand, the rotation sensor disclosed in Patent Document 2 includes a rotor which is disposed to a rotating shaft and has a sensing portion whose width varies along a circumferential direction, and a fixed core which is disposed to a fixing member and arranged to face the sensing portion with a gap in an axial line of the shaft therebetween. It is to be noted that the fixed core has a first exciting coil through which an alternating excitation current flows to form a magnetic circuit between itself and the rotor and a first core which is formed of an insulating magnetic material to hold the first exciting coil. Moreover, this rotation sensor further includes a conductor layer whose width varies along a rotating direction and a Geneva gear which is fed at a predetermined rotation angle in accordance with each rotation of the rotor in one of the fixing members sandwiching a rotation surface of the rotor. Additionally, the rotation sensor also has a second exciting coil and a second core which holds this exciting coil, and includes a detection coil which gradually varies an output in accordance with a feed amount (the number of revolutions of the rotor) of the Geneva gear to detect the number of revolutions of the rotor.

Further, a displacement sensor which is disposed to a measurement target to detect a displacement amount of this measurement target is well known (see, e.g., Patent Document 3). The displacement sensor disclosed in Patent Document 3 includes a coil member in which a coil is formed by winding and to which an alternating current is applied and a mover which is arranged to face the coil member to form a predetermined gap therebetween and displaced along the coil. Furthermore, a displacement amount of the mover is detected based on an inductance fluctuation of the coil caused due to a change in an effective inductive coupling area between the coil and the mover.

Patent Document 1: Japanese Patent Application Laid-open No. 2001-505667 (pp. 6-10, FIG. 1)
Patent Document 2: Japanese Patent Application Laid-open No. 2003-202240 (pp. 2-4, FIG. 1)
Patent Document 3: Japanese Patent Application Laid-open No. 2004-170273 (pp. 5-7, FIG. 1)

DISCLOSURE OF INVENTION

Problem to be Solved by the Invention

As explained above, according to the rotation sensor disclosed in Patent Document 1, the gears of the sub-rotors respectively mesh with the gear of the main rotor to calculate an absolute rotation angle of the main rotor, i.e., the rotor to be measured from rotation detection values of the respective sub-rotors. Therefore, a detection angle error due to a backlash between the gear of one sub-rotor and the gear of the main rotor and a detection angle error due to a backlash between the gear of the other sub-rotor and the gear of the main rotor overlap each other as an angle error in a rotation angle of the main rotor. Accordingly, this rotation sensor disclosed in Patent Document 1 is not suitable for detecting an accurate rotation angle of the rotor to be measured.

On the other hand, the rotation sensor disclosed in Patent Document 2 utilizes a combination of the ring-like sensing portion formed of an electroconductive member and the coil core which generates a magnetic flux so as to cross this sensing portion, thereby measuring a rotation angle of the main rotor. Therefore, an absolute rotation angle of the rotor to be measured can be accurately detected as compared with the rotation sensor disclosed in Patent Document 1. However, since the Geneva gear, the conductive layer, and the detection coil are used to gradually output the number of revolutions of the main rotor in accordance with each number of revolutions, detecting the number of revolutions of the main rotor may be difficult when a difference between output stages corresponding to the respective number of revolutions of the main rotor is small.

Furthermore, in regard to the displacement sensor disclosed in Patent Document 3, when a certain level of a dimensional tolerance of each single component is allowed to reduce a cost or a certain level of an assembling tolerance is admitted to achieve easiness in assembling the displacement sensor, there occurs a problem that an allowable range for the dimensional tolerance of each component itself or the displacement concerning assembling the components is narrowed and hence the accuracy must be improved.

It is an object of the present invention to provide a rotation sensor which is superior in a detection accuracy and assembling properties allowing a certain level of a dimensional tolerance or assembling tolerance of components.

Specifically, it is an object of the present invention to provide a rotation sensor with a high detection accuracy in which a resolution for detection of an absolute rotation angle of a rotor to be measured is improved and noise resistance is enhanced.

Means for Solving Problem

To achieve the object, according to claim 1 of the present invention, there is provided a rotation sensor comprising: a main rotor which integrally rotates with a rotor to be measured; a sub-rotor which rotates in accordance with rotation of the main rotor with the number of revolutions which is different from that of the main rotor; first detecting means for detecting rotation of the main rotor; and second detecting means for detecting rotation of the sub-rotor, the rotation sensor detecting an absolute rotation angle of the rotor to be measured from a detection signal from the first detecting means and a detection signal from the second detecting means, wherein the respective detection signals obtained from the first detecting means and the second detecting means are cyclically output in accordance with rotation of each rotor, and the following relationship is satisfied:

$$(Tm-Tc \times i) \times n = Tm \text{ (} i \text{ and } n \text{ are positive integers)}$$

where Tc is a cycle of the detection signal from the first detecting means, and Tm is a cycle of the detection signal from the second detecting means.

When a rotation angle of the main rotor and a rotation angle of the sub-rotor which rotates with the number of revolutions which is different from that of the main rotor are detected under conditions that the detection cycles of the respective detecting means satisfy the above-explained relationship, a resolution for detection of a rotation angle of the main rotor, i.e., a rotor to be measured can be improved, and noise resistance can be enhanced.

Moreover, in an exemplary rotation sensor, the cycle Tc of the detection signal of the main rotor is 90 degrees, and the cycle Tm of the detection signal of the sub-rotor is 191.25 degrees.

According to this combination of the cycles, a combination of two output values from the first detecting means and the second detecting means can be optimally associated with an absolute rotation angle of the main rotor.

Additionally, according to an exemplary rotation sensor, the cycle Tc of the detection signal of the main rotor is 120 degrees, and the cycle Tm of the detection signal of the sub-rotor is 130 degrees.

Based on this combination of the cycles, a combination of two output values from the first detecting means and the second detecting means can be also optimally associated with an absolute rotation angle of the main rotor.

Further, according to an exemplary rotation sensor, the cycle Tc of the detection signal of the main rotor is 120 degrees, and the cycle Tm of the detection signal of the sub-rotor is 260 degrees.

Based on this combination of the cycles, the combination of two output values from the first detecting means and the second detecting means can be optimally associated with an absolute rotation angle of the main rotor.

Further, according to an exemplary rotation sensor, the following relationship is satisfied:

$$Tx \geq 1440 \text{ degrees}$$

where Tx is a common minimum one in respective multiples obtained by multiplying the cycle Tm and the cycle Tc by different positive integers.

When such a relationship is satisfied, a plurality of absolute rotation angle solutions of the main rotor associated with a combination of two output values from the first detecting means and the second detecting means can be prevented from being produced in the measurement range of ±720 degrees, and this absolute rotation angle can be assuredly and uniquely obtained from an output value from the first detecting means and an output value from the second detecting means.

Furthermore, according to an exemplary rotation sensor, a relationship of $Tx = Tc \times n$ is satisfied.

When such a relationship is satisfied, a gap between analytical curves which are adjacent to each other and defined by a combination of two output values from the first detecting means and the second detecting means is widened. As a result, the range of a combination of Tm and Tc can be narrowed, and combinations which do not improve detection performance can be reduced from combinations of two output values from the first detecting means and the second detecting means associated with an absolute rotation angle of the main rotor so that the combinations can be narrowed down to an effective combination range.

According to an exemplary rotation sensor, the first detecting means comprises: an electroconductive sensing portion which integrally rotates with the main rotor and whose width varies along a circumferential direction; and an exciting coil which detects a rotation angle of the main rotor based on electromagnetic induction in cooperation with the sensing portion, and the second detecting means comprises a magnetic flux detection element which detects a change in a magnetic flux of a magnet associated with rotation of the sub-rotor, the magnet being provided to the sub-rotor.

When such a detection method is adopted, a detection accuracy can be greatly improved as compared with the rotation sensor utilizing two gears in the sub-rotors. Moreover, as compared with a rotation sensor which detects the number of revolutions of the main rotor by using a Geneva gear, a detection accuracy or resistance to vibration can be improved, and assembling properties of the rotation sensor itself can be enhanced.

More specifically, it is possible to eliminate a drawback of a conventional rotation sensor including a Geneva gear, i.e., a drawback that gradually outputting the number of revolutions of the main rotor in accordance with each number of revolutions by using a Geneva gear, a conductor layer, and a detection coil makes it difficult to detect the number of revolutions of the main rotor when a difference between output stages associated with each number of revolutions of the main rotor is small.

Additionally, it is possible to solve a problem of a reduction in vibration resistance of the rotation sensor itself caused due to the fact that the Geneva gear may possibly rotate by, e.g., vibration, which is another drawback of the rotation sensor according to a conventional technology.

Further, it is possible to solve a problem in assembling properties and a cost which is still another drawback of the rotation sensor according to the conventional technology, i.e., a drawback of poor assembling properties of the rotation sensor itself since a rotor whose width varies depending on a rotating direction is provided to the Geneva gear and hence positioning each component is not easy when providing a pair of a coil and a core at a position where the rotor is sandwiched and a drawback of an increase in a cost for the number of components and the number of assembling steps.

Furthermore, according to an exemplary rotation sensor, the exciting coil is held by a core main body formed of a mixed soft magnetic material obtained by mixing Mn-Zn-based soft magnetic material ferrite in polyphenylene sulfide.

Since molding is facilitated by utilizing so-called soft ferrite as a material of a core main body, a degree of freedom for designing a shape of the core can be improved.

According to an exemplary rotation sensor, the exciting coil is held by a core main body formed of a mixed soft magnetic material obtained by mixing Fe-Si-Al-based Sendust in an epoxy resin.

When such Sendust is used for the core main body, a magnetic permeability can be increased to improve detection characteristics. Moreover, temperature characteristics of the magnetic permeability can be enhanced, and the rotation sensor can be used in a use environment having a wide temperature range without being affected by an ambient temperature.

Additionally, there is provided a rotation sensor comprising: an electro-conductive sensing portion in which at least one of a width and a thickness thereof varies in accordance with movement of a measurement target; and a coil core having a core main body arranged to face the sensing portion and an exciting coil arranged in accordance with the outer peripheral wall of the core main body, wherein a surface of the core main body opposed to the sensing portion side has a track-like shape, and the sensing portion is assembled to be shifted in a linear part of the track-like opposed surface of the core main body.

Even if the sensing portion is shifted in a linear part of the track-like opposed surface of the core main body, an area of the sensing portion crossing a magnetic flux is rarely changed, and an error in an output value of a detected rotation amount can be consequently suppressed to the minimum level even though the sensing portion slightly deviates in a longitudinal direction of the core main body. Therefore, a rotation amount can be stably detected without being affected by a dimensional tolerance of components or an assembling tolerance.

There is also provided a rotation sensor comprising: an electro-conductive sensing portion in which at least one of a width and a thickness thereof varies in accordance with movement of a measurement target; and a coil core having a core main body arranged to face the sensing portion and an exciting coil arranged in accordance with the outer peripheral wall of the core main body, wherein a protruding portion around which the exciting coil is wound is formed in the core main body, and a tapered portion which is inclined along an extending direction of the sensing portion is formed in at least a part of a surface of the protruding portion opposed to the sensing portion.

Even if a gap between the sensing portion and a sensing portion opposed surface of the core main body is shifted, a magnetic flux cutting across the sensing portion is substantially rarely changed since such a tapered portion is formed, and an error in an output value of a detected rotation amount can be consequently suppressed to the minimum level even though the gap between the sensing portion and the sensing portion opposed surface of the core main body is slightly shifted. Therefore, a rotation amount can be stably detected without being affected by a dimensional tolerance of components or an assembling tolerance.

There is also provided a rotation sensor comprising: an electro-conductive sensing portion in which at least one of a width and a thickness thereof varies in accordance with movement of a measurement target; and a coil core having a core main body arranged to face the sensing portion and an exciting coil arranged in accordance with the outer peripheral wall of the core main body, wherein a surface of the core main body opposed to the sensing portion side has a rectangular shape in which a direction perpendicular to an extending direction of the sensing portion is a longitudinal direction, and the sensing portion is assembled to be shifted in the rectangular opposed surface of the core main body along the longitudinal direction.

Even in the rotation sensor having such a configuration, an area of the sensing portion crossing a magnetic flux is rarely changed even though the sensing portion is shifted in the longitudinal direction within the rectangular opposed surface of the core main body, thereby suppressing an error in an output value of a detected rotation amount to the minimum level. Therefore, a rotation amount can be stably detected without being affected by a dimensional tolerance of components or an assembling tolerance.

BRIEF DESCRIPTION OF DRAWINGS

FIG. 9 is a list showing a relationship between a small steering angle, a large steering angle, and an absolute rotation angle in the small steering angle range of 44 degrees to 46 degrees in the order of absolute rotation angles;

BEST MODE(S) FOR CARRYING OUT THE INVENTION

A rotation sensor according to a first embodiment of the present invention will now be explained with reference to the accompanying drawings. It is to be noted that an explanation will be given as to an example where this rotation sensor is disposed to a steering shaft in relation to a steering device in a car and the rotation sensor is used to detect a rotation angle of a steering wheel.

Figure 1:
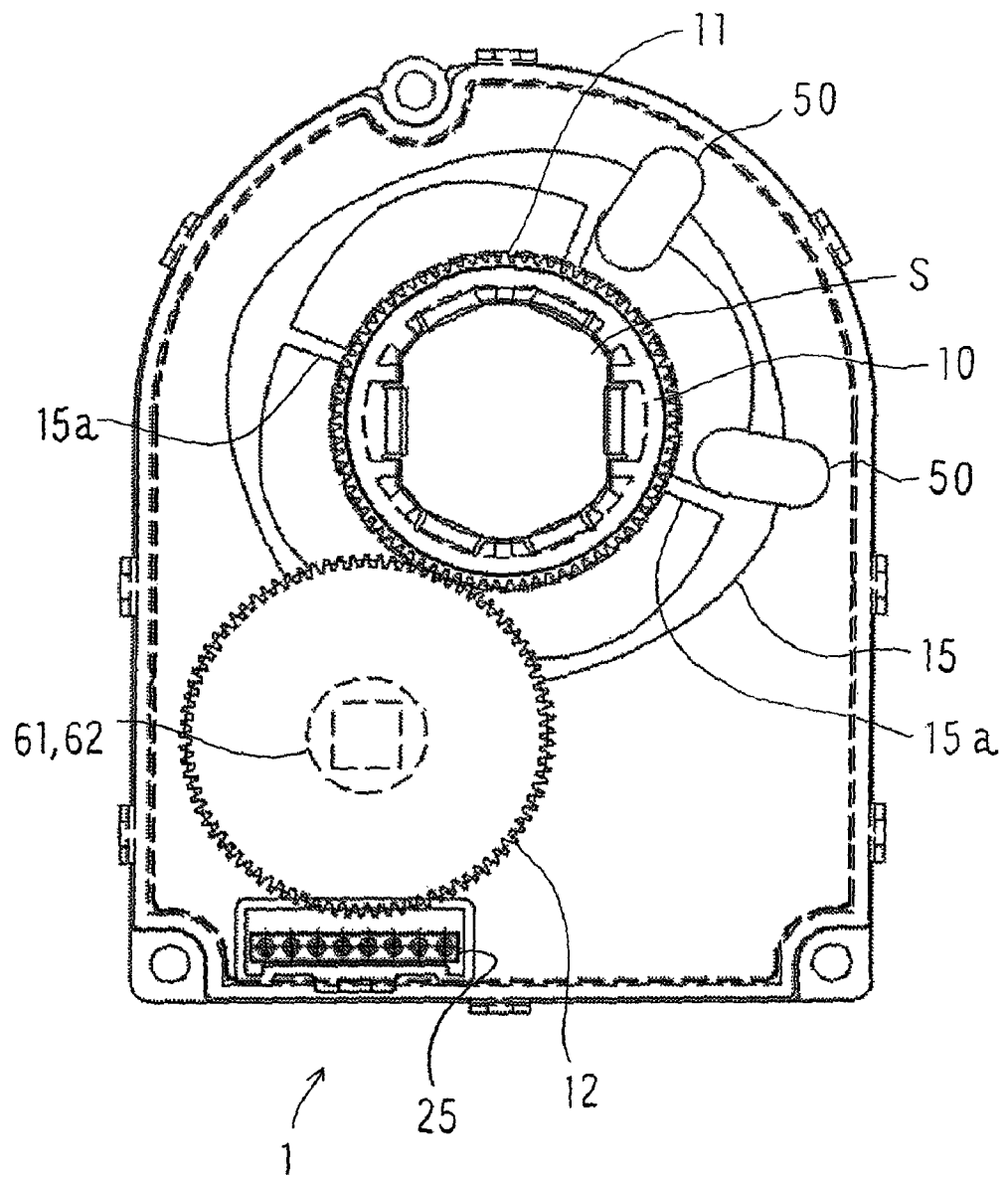
FIG. 1 is a plan view showing a rotation sensor according to a first embodiment and a second embodiment of the present invention in a state where an upper case is depicted based on perspective.
Figure 2:
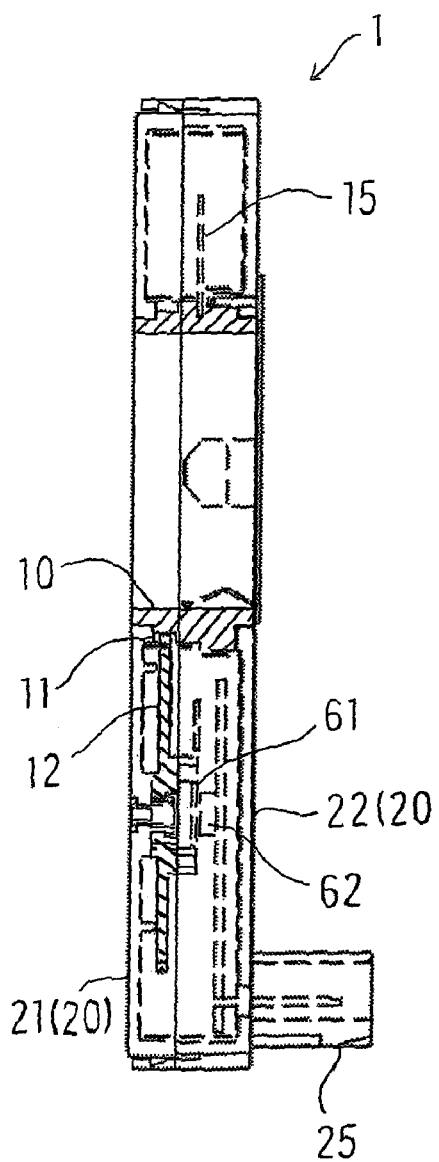
FIG. 2 is a partially perspective side view showing an internal structure of the rotation sensor corresponding to FIG. 1.

As shown in FIGS. 1 and 2, the rotation sensor 1 according to the first embodiment of the present invention includes a rotor 10 which is fitted in a steering shaft S (which will be simply referred to as a "shaft S" hereinafter) as a rotor to be measured and provided with a first gear 11 at an outer peripheral portion thereof, a second gear 12 which meshes with the first gear 11 of the rotor 10, a lower case 21 which rotatably supports the rotor 10 and the second gear 12, and an upper case 22 which is fitted to the lower case 21 to form a box-like case 20.

The rotor 10 is formed of a synthetic resin superior in strength and moldability, stays 15a are extended from predetermined positions at a periphery of the rotor 10, and a tabular sensing portion 15 having a board thickness of, e.g., 0.5 mm is annularly provided around the rotor 10 through the stays 15a. It is to be noted that the sensing portion 15 is formed of an electroconductive member, e.g., brass, silver, aluminum, or copper and its width regularly varies from, e.g., 2 mm to 5 mm at every 90 degrees in a circumferential direction in this embodiment. When the width of the sensing portion 15 varies every 90 degrees in the circumferential direction in this manner, a large change in detection signals from coil cores 50 with respect to an actual rotation angle of the rotor 10 can be assured.

Further, the upper case 22 and the lower case 21 are formed of a shielding material consisting of a metal or an insulating magnetic material which is superior in strength and has alternating-current magnetic field shielding properties, and the upper case 22 and the lower case 21 constitute a box body in cooperation with each other so that the rotor 10, the sensing portion 15, or the second gear 12 is accommodated therein. Furthermore, a connector 25 which supplies power to the rotation sensor 1 or transmits a detection signal from the rotation sensor 1 to the outside is provided in the lower case 21.

Figure 3:
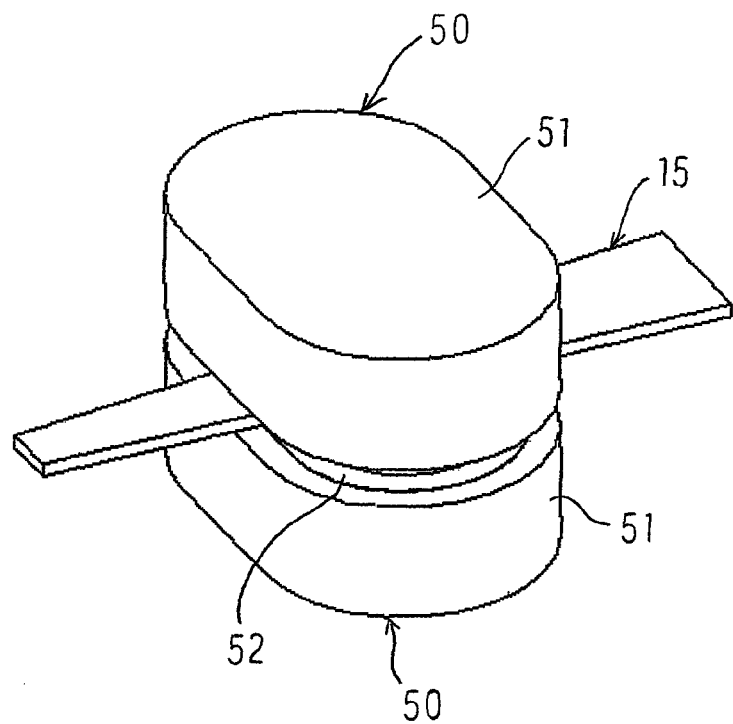
FIG. 3 is an enlarged perspective view showing a relationship between coil cores and a sensing portion of the rotation sensor depicted in FIG. 1.

Moreover, as shown in FIGS. 1 and 3, two pairs of coil cores 50 are disposed to the upper case 22 and the lower case 21 to face a sensing surface of the sensing portion 15 of the rotor 10 with a predetermined gap therebetween. It is to be noted that the sensing portion 15 and the coil cores 50 constitute first detecting means in cooperation with each other.

The two pairs of coil cores 50 are disposed in the circumferential direction of the sensing portion 15 at a predetermined angle in such a manner that an output value of each later-explained phase shift amount is shifted by 22.5 degrees as shown in FIG. 1, and each outer rim has a shape like a track for athletic sports when seen in a plan of FIG. 1 as shown in FIG. 3. It is to be noted that one cycle of the sensing portion 15 is 90 degrees in this embodiment as will be explained later and hence the two pairs of coil cores 50 are arranged in such a manner that a shift corresponding to a ¼ cycle, i.e., 22.5 degrees is observed.

The coil core 50 includes a core main body 51 formed of an insulative soft magnetic material, e.g., a plastic magnet (e.g., a mixed soft magnetic material obtained by mixing Mn—Zn-based soft magnetic ferrite in PPS (polyphenylene sulfide)), and an exciting coil 52 which is wound around a track-like inner circumferential groove formed along an outer peripheral portion of the core main body 51 and accommodated in the core main body 51. In this case, the core main body 51 is formed by injection molding, and its magnetic powder filling ratio is approximately 50 weight %. When the soft magnetic material containing soft ferrite is subjected to injection molding with such a filling ratio to form the core main body 51, a degree of freedom in setting a core shape can be improved since molding is easy.

It is to be noted that, in place of holding the exciting coil by the core main body 51 using such so-called soft ferrite, the exciting core may be held by the core main body formed of a mixed soft magnetic material obtained by mixing Fe—Si—Al-based Sendust in an epoxy resin. In this case, the core main body is formed by powder compacting molding, and its magnetic powder filling ratio is equal to or above 90 weight %. When the soft magnetic material containing Sendust is subjected to powder compacting molding with such a filling ratio to form the core main body, magnetic permeability can be increased to improve detection characteristics. Moreover, temperature characteristics of the magnetic permeability can be improved, thereby using the rotation sensor in an environment having a wide temperature range.

Additionally, the exciting coils 52 facing each other are connected in series and electrically connected with a printed board of a non-illustrated rotation angle detecting portion in the case 20. Further, when an alternating exciting current flows through the exciting coils 52 facing each other, an alternating-current magnetic field is circumferentially formed, and the alternating-current magnetic field crosses the sensing surface of the sensing portion 15 between each pair of core main bodies 51.

Furthermore, although an eddy current occurs in the sensing portion 15 formed of an electroconductive member due to the alternating-current magnetic field produced from the coil cores 50, the generated eddy current varies in accordance with a change in the width of the sensing portion 15 associated with rotation of the rotor 10, an impedance fluctuation based on this change in the eddy current is detected, and each coil core 50 detects a rotation angle of the rotor 10 with a cycle of 90 degrees.

It is to be noted that each pair of coil cores 50 are arranged to face each other with the sensing portion 15 therebetween because an output from each coil core 50 fluctuates when a position of the rotor 10 fluctuates in an axial direction of the shaft S due to, e.g., vibration, but an output from one coil core 50 is reduced while an output from the other coil 50 is increased, and hence detecting the outputs from the two opposed coil cores 50 enables offsetting an output fluctuation in each coil core 50.

A signal processing method of detecting a rotation angle of this rotor 10 is as follows. It is to be noted that a drawing of each circuit configuration will be omitted. First, an oscillation circuit outputs an oscillation signal having a specific frequency to a phase shift portion made up of a resistor, the exciting coil 52, and a capacitor through a frequency division circuit. At this time, an impedance of each exciting coil 52 varies in accordance with a magnitude of occurrence of an eddy current in the sensing portion 15, and a phase of a voltage signal at each of both ends of each capacitor also changes due to this variation. Moreover, the voltage signal at each of both ends of the capacitor is output to a phase shift amount detecting portion, and the detecting portion detects a phase shift amount of the voltage signal at each of both ends of each capacitor. Additionally, a converter converts the detected phase shift amount into a corresponding voltage value.

Figure 6:
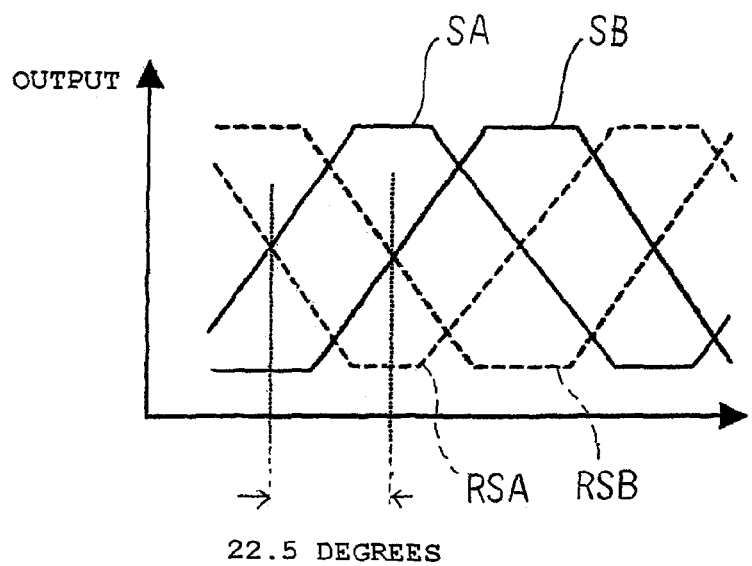
FIG. 6 are explanatory drawings showing a method of detecting a rotation angle of a rotor based on a combination of the coil cores and the sensing portion depicted in FIG. 3 in the order of FIG. 6(a) and FIG. 6(b)
Figure 6:
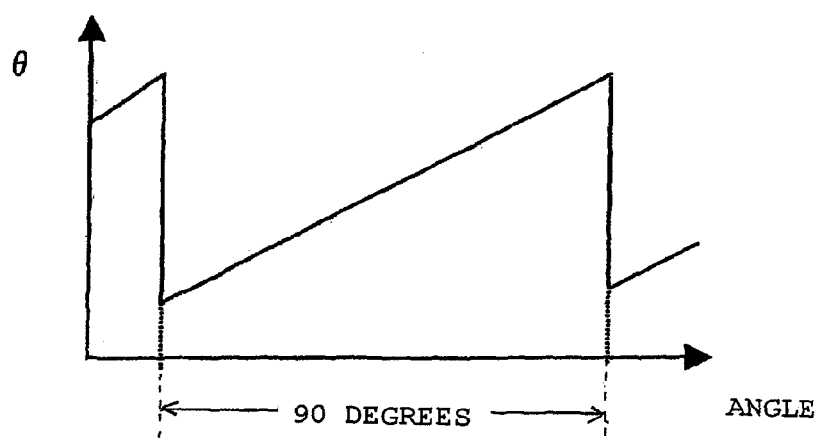

It is to be noted that the coil cores 50 are arranged in the circumferential direction of the sensing portion 15 in the case 20 in such a manner that phases of phase shift amount output signals obtained when the respective coil cores 50 cooperate with the sensing portion 15 are shifted 22.5 degrees in this embodiment, and hence the above-explained signal processing enables obtaining output values of phase shift amounts in a cycle of 90 degrees having phases shifted 22.5 degrees like a phase shift amount output value SA from one coil core 50 and a phase shift amount output value SB from the other coil core 50 as shown in FIG. 6(a).

A method of detecting a rotation angle of the rotor 10 from the thus obtained phase shift amount output values in the cycle of 90 degrees is as follows.

As shown in FIG. 6(a), an output value (SA, SB) of a rotation angle of the rotor 10 obtained from each coil core 50 is superimposed on an output value (RSA, RSB) obtained by inverting the former output value. Further, a judgment is made upon which one of the ranges of 0 degree to 22.5 degrees, 22.5 degrees to 45 degrees, 45 degrees to 67.5 degrees, and 67.5 degrees to 90 degrees a rotation angle of the rotor 10 belongs to from a magnitude relationship of the respective phase shift amount detection values. Furthermore, linear parts of these four phase shift amount detection values are used, and the linear parts are jointed (coupled) to each other. Then, a rotation angle of the rotor 10 is obtained in the cycle of 90 degrees from an output signal having a sawtooth-like shape which varies in the cycle of 90 degrees depicted in FIG. 6(b) based on a result of the judgment on one of the four angle ranges the rotation angle belongs to.

On the other hand, as shown in FIGS. 1 and 2, the lower case 21 includes a magnet 61 which integrally rotates with the second gear 12 around a central part of the second gear 12, and an MR element (a magnetic flux detection element) 62 which detects a magnetic flux of this magnet 61 at a part of the lower case 21 facing the magnet 61. Moreover, this magnet 61 and the MR element 62 cooperate with each other to constitute second detecting means.

Figure 8:
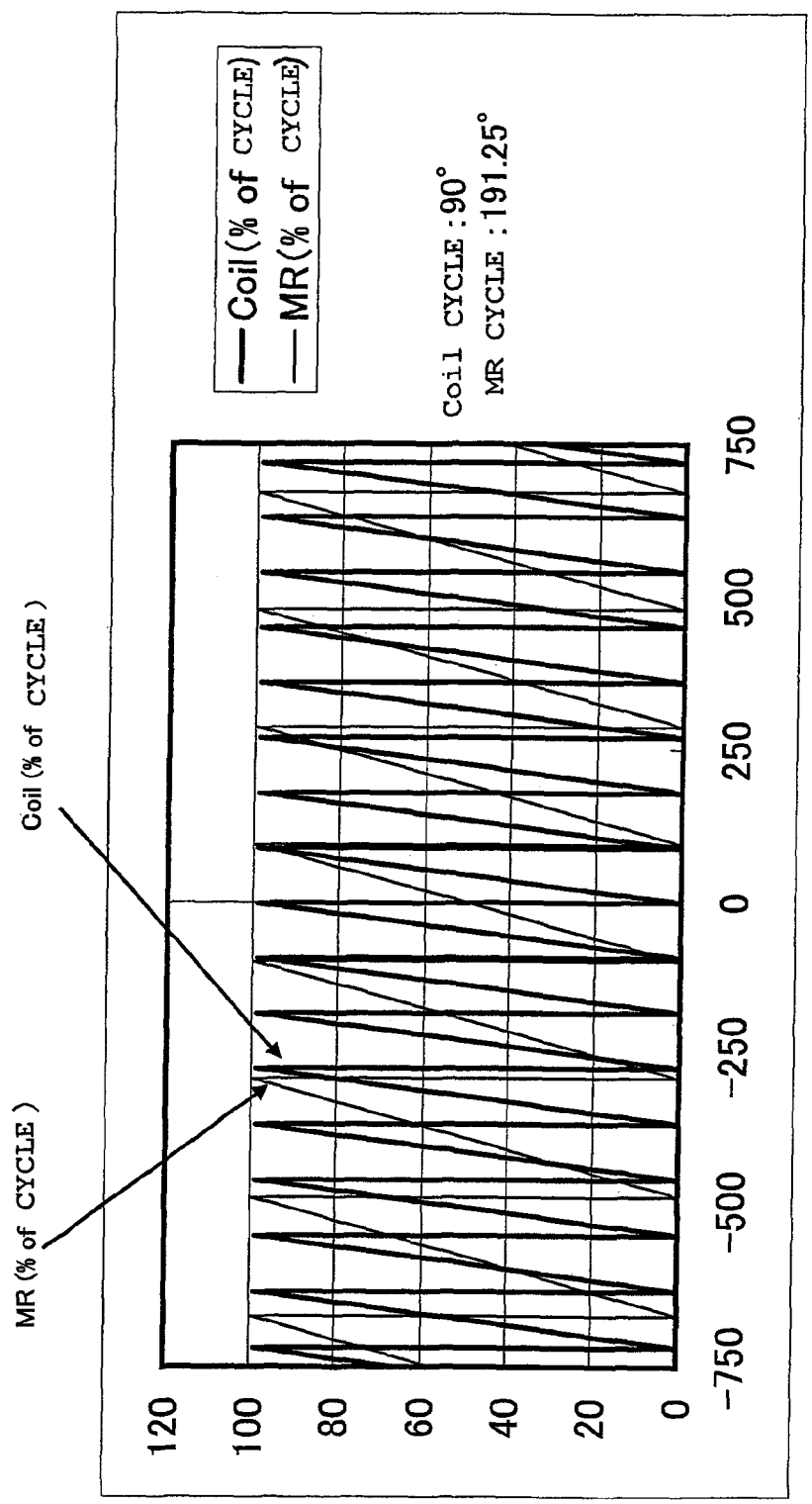
FIG. 8 is a view showing a ratio with respect to a coil core detection output cycle and a ratio with respect to an MR element detection output cycle associated with an absolute rotation angle of a rotor to be measured.

Detection outputs from the MR element 62 are obtained as an sin curve-like detection output and a cos curve-like detection output, and these detection outputs are converted into a detection output of a tan function to be output as an output signal having a sawtooth-like waveform which varies in a cycle of 191.25 degrees as shown in FIG. 8. It is to be noted that this signal processing method is well known as disclosed in, e.g., Japanese patent Application Laid-open No. 2004-53444. The cycle of the detection output from the MR element 62 is 191.25 degrees in this manner because the number of teeth of the first gear 11 provided to the rotor 10 is 80 and the number of teeth of the second gear 12 is 85 in this embodiment, and hence the cycle of a detection signal from the MR element 62 detected in accordance with rotation of the second gear 12 is 180 degrees×85/80=191.25 degrees based on a relationship of these numbers of teeth.

As explained above, in the rotation sensor 1 according to this embodiment, a first detection signal obtained from the first detecting means constituted of the coil cores 50 and the sensing portion 15 in cooperation with each other is output in the cycle of 90 degrees in accordance with rotation of the rotor 10, and a second detection signal obtained from the second detecting means constituted of the magnet 61 and the MR element 62 in cooperation with each other is output in the cycle of 191.25 degrees in accordance with rotation of the second gear 12, but each of the following relationships must be satisfied in the cycle periods of these detection signals in the rotation sensor 1 according to the present invention.

First, as a first relationship which should be satisfied by the cycle of each detection signal, a relationship of $(Tm-Tc \times i) \times n = Tm$ (i and n are positive integers) is satisfied, where a cycle of a detection signal of the coil cores (the first detecting means) 50 is Tc and a cycle of a detection signal of the MR element (the second detecting means) 62 is Tm. When such a relationship is satisfied, a resolution for detection of an absolute rotation angle of the rotor 10, i.e., the shaft S to be measured is improved, and noise resistance is enhanced. It is to be noted that, in case of the rotation sensor 1 according to this embodiment, when Tc=90 degrees, Tm=191.25 degrees, i=2, and n=17, $(191.25-90 \times 2) \times 17 = 191.25$ is achieved, thereby satisfying the above-explained relational expression.

Additionally, in respective multiples obtained by multiplying the cycle Tm and the cycle Tc by different positive integers, assuming that a common minimum multiple is Tx, a relationship of $Tx \geq 1440$ degrees is satisfied. When such a relationship is satisfied, a plurality of absolute rotation angle solutions of the rotor 10, i.e., the shaft S associated with combinations of two output values obtained from the coil cores 50 constituting the first detecting means and the MR element 62 constituting the second detecting means can be avoided from being produced in the measurement range of ±720 degrees, and an absolute rotation angle of the rotor 10, i.e., the shaft S can be assuredly and uniquely obtained from an output value of the coil cores 50 and an output value of the MR element 62.

It is to be noted that, in case of the rotation sensor 1 according to this embodiment, assuming that Tc=90 degrees and Tm=191.25 degrees, Tx=90×17=191.25×8=1530 degrees is achieved, thereby satisfying the above-explained relational expression.

Further, a relationship of Tx=Tc×n is satisfied. As a result, a gap between analytical curves which are adjacent to each other and defined by a combination of two output values from the first detecting means and the second detecting means is widened. Consequently, the range of combinations of Tm and Tc can be further narrowed, and combinations with which detection performance is not improved can be reduced from combinations of two output values from the first detecting means and the second detecting means corresponding to an absolute rotation angle, thereby narrowing down combinations to an effective combination range.

It is to be noted that, in case of the rotation sensor according to this embodiment, since Tc=90 degrees and Tx=1530 degrees, 1530=90×17 is achieved, and n=17 is consequently attained, thereby satisfying the above-explained relational expression.

It is to be noted that the rotor 10 as a main rotor, i.e., the shaft S makes one revolution at 360 degrees, and hence Tc necessarily becomes 360 degrees or below, thus satisfying a relationship of Tc=360 degrees/k (k is a positive integer).

In this embodiment, of the cycles satisfying the above-explained relational expression, the cycle Tc of the detection signal of the rotor 10 as a main rotor is 90 degrees and the cycle Tm of the detection signal of the second gear as a sub-rotor is 191.25 degrees as explained above. According to this combination of the cycles, a combination of two output values from the first detecting means and the second detecting means is optimally associated with an absolute rotation angle of the rotor 10 as the main rotor.

However, the relationship between the cycle of the rotation detection signal of the rotor 10 obtained from the coil cores 50 as the first detecting means and the cycle of the rotation detection signal of the second gear 12 acquired from the MR element 62 as the second detecting means is not restricted to 90 degrees and 191.25 degrees like this embodiment, and other cycles can be used as long as each cycle satisfies the above-explained relational expression.

When these relationships are satisfied, as will be explained later, analytical curves required to obtain an absolute rotation angle of the rotor 10, i.e., the shaft S from a combination of the first detection signal acquired from the coil cores 50 and the sensing portion 15 and the second detection signal acquired from the magnet 61 and the MR element 62 are uniformly distributed over a wide absolute rotation angle range as shown in FIG. 9. That is, a region where the analytical curves are distributed can be widened as large as possible, and the analytical curves are distributed at equal intervals in this widened region. As a result, a correspondence relationship of an absolute rotation angle of the rotor 10, i.e., the shaft S with respect to a combination of the rotation detection signal from the coil cores 50 and the rotation detection signal from the MR element 62 can be cleared up.

Figure 7:
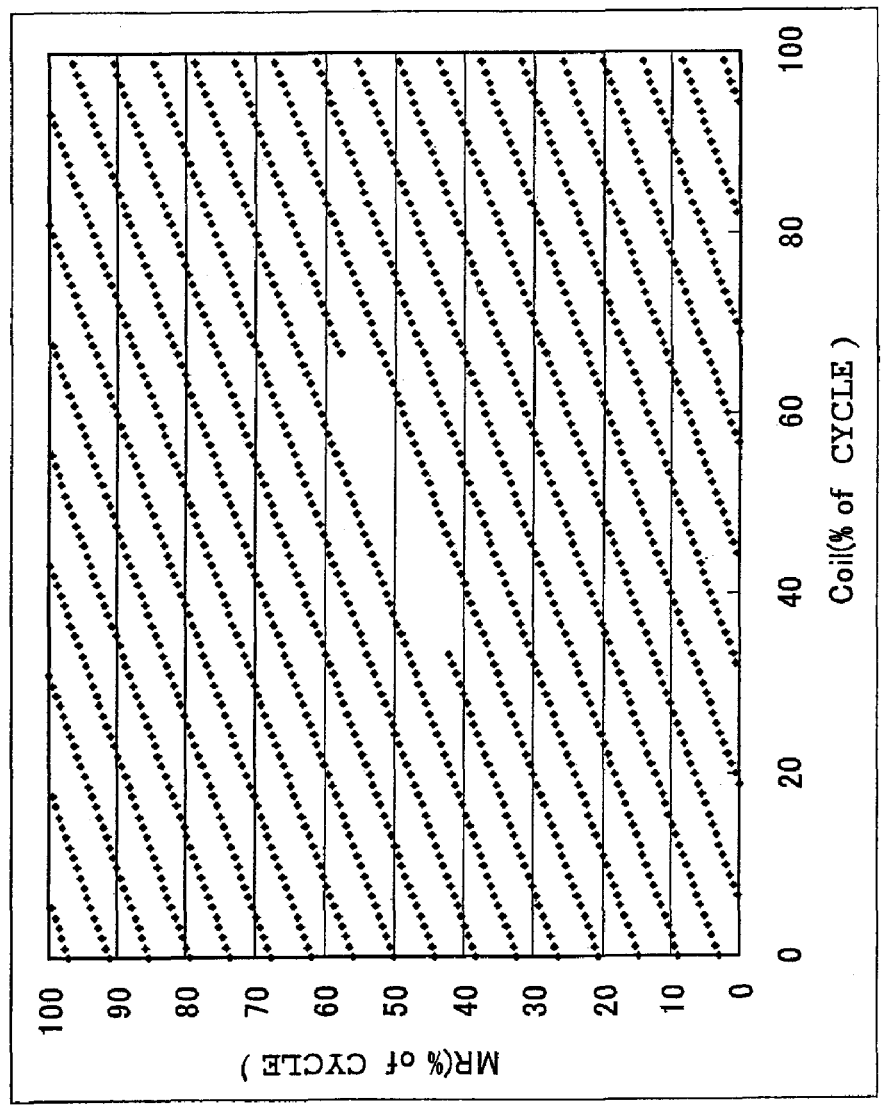
FIG. 7 shows analytical curves indicating a combination of a ratio with respect to a coil core detection output cycle and a ratio with respect to an MR element detection output cycle associated with an absolute rotation angle.

Incidentally, even if the cycle of the rotation detection signal from the coil cores 50 is 120 degrees and the cycle of the rotation detection signal from the MR element 62 is 130 degrees as another example, the cycles of the first detection signal and the second detection signal can satisfy the above-explained relational expression, thereby accurately detecting an absolute rotation angle of the rotor 10, i.e., the shaft S. That is, even in such a case, the respective analytical curves depicted in FIG. 7 can be distributed and defined as a whole in the wide absolute rotation angle range of the rotor 10 to be measured, i.e., the shaft S.

A method of measuring an absolute rotation angle of the shaft S using the above mentioned rotation sensor 1 will now be explained. In the rotation sensor 1 according to this embodiment, since the cycle of the detection signal from the coil cores 50 and the cycle of the detection signal from the second gear 12 satisfy the special relationship as explained above, a correspondence relationship between the cycle of the output signal from the coil cores 50 associated with rotation of the rotor 10 and the cycle of the output signal from the MR element 62 provided in the second gear 12 is a relationship restricted to the analytical curves depicted in FIG. 7. With such a relationship, as shown in FIG. 8, rotation signal detection values of the rotor 10 obtained from the coil cores 50 and the sensing portion 15 are alternately continuously output with a sawtooth-like waveform every 90 degrees in the range of −750 degrees to +750 degrees, and the cycles of the rotation angle detection outputs of the second gear 12 obtained from the MR element 62 and the magnet 61 are alternately continuously output with a sawtooth-like waveform every 191.25 degrees.

Therefore, comparing the phase detected from the coil cores 50 and the sensing portion 15 with the phase detected from the MR element 62 and the magnet 61 enables accurately obtaining an absolute rotation angle of the shaft S which integrally rotates with the rotor 10 as explained below.

FIG. 9 is a list showing an example of correspondence relationships between detection output values of a small steering angle obtained by detecting a rotation angle of the rotor 10 every 90 degrees, detection output values of a large steering angle obtained by detecting a rotation angle of the second gear 12 every 191.25 degrees, and absolute rotation angles of the rotor 10 as a rotor to be measured, i.e., the shaft S obtained based on these detection output values. Here, in the rotation sensor 1 according to this embodiment, all relationships of absolute rotation angles associated with these values may be stored in a memory in a one-on-one relationship, but the absolute rotation angles are uniquely obtained from the detection output values of the small steering angle and the detection output values of the large steering angle based on a calculation by a microcomputer in this embodiment.

A method of determining the absolute rotation angles from the detection output values of the small steering angle and the detection output values of the large steering angle will now be explained in detail hereinafter. It is to be noted that angles detected by the MR element 62 which detects the large steering angle are −95.625 degrees to +95.625 degrees (191.25 degrees in total). Further, angles determined by the coil cores 50 which detect the small steering angle are 0 degree to +90 degrees. Furthermore, the angles detected by both the MR element 62 and the coil cores 50 are 0 degree at an origin.

Here, as a range of sensing, since the detection cycle Tc of the coil cores 50 is 90 degrees and the detection cycle Tm of the MR element 62 is 191.25 degrees, when a least common multiple is considered, 90×17=191.25×8=1530 degrees is achieved.

That is, when the rotor 10 is rotated 1530 degrees in one of two directions, since a detection output of the small steering angle obtained from the coil cores 50 and a detection output of the large steering angle obtained from the MR element 62 have completely the same relationship, the range specification of sensing is set to the range of 1530 degrees (−765 degrees to +765 degrees) to measure an absolute rotation angle of the rotor 10, i.e., the shaft S in this embodiment.

It is to be noted that, for example, considering a case where the cycle of the MR element 62 is 192 degrees, since the cycle Tc of the coil cores=90 degrees and the cycle Tm of the MR element=192 degrees, 90×32=192×15=2880 degrees is achieved, and hence the range of −1440 degrees to +1440 degrees becomes the sensing range.

How the large steering angle is associated with a specific small steering angle will now be explained. In this embodiment, an angle of the large steering angle varies every 191.25×(90×2)=11.25 degrees with respect to the small steering angle. However, the cycle of the MR element 62 is double, two types of large steering angles (44 degrees and −46 degrees are base points) are present as seen from the small steering angle.

The table of FIG. 9 shows the large steering angles and the absolute angles when the small steering angle is 44 degrees. In this case, when the absolute rotation angles are −766 degrees and 764 degrees, the small steering angle and the large steering angle have the same relationship. Moreover, even in another case, these steering angles have the same relationship when the absolute angles have an interval of 1530 degrees.

Moreover, a relationship of Tx=Tc×n is satisfied. As a result, each gap between analytical curves which are adjacent to each other and defined by combinations of two output values from the first detecting means and the second detection means is widened. Based on this, the combination range of Tm and Tc is further narrowed, and combinations with which detection performance is not improved are reduced from the combinations of the two output values from the first detecting means and the second detecting means associated with the absolute angle, thereby narrowing down the combinations to an effective combination range.

It is to be noted that, since the rotor 10 as the main rotor, i.e., the shaft S makes one revolution at 360 degrees, Tc necessarily becomes 360 degrees or below, thus satisfying a relationship of Tc=360 degrees/k (k is a positive integer).

A method of determining an absolute rotation angle of the rotor 10 to be measured, i.e., the shaft S from the detected large steering angle and small steering angle will now be explained. In this case, the absolute rotation angle range is −750 degrees to +750 degrees. It is assumed that the small steering angle is detected as 44.00 degrees based on a detection value from the coil cores 50. In this case, the large steering angle is determined based on a detection value from the MR element 62. It is assumed that the detection value from the MR element 62 is approximately −12.25 degrees as shown in FIG. 9. In this case, since a +/− sign (minus) of the large steering angle is opposite to that (plus) of the small steering angle, the large steering angle is incremented by 11.25 degrees toward −12.2 degrees with 44−90=−46 degrees being determined as a base point. In this case, when a value of 11.25 degrees is added three times like −46/−34.75/−23.5/−12.25, the obtained value becomes close to the large steering angle detected by the MR element 62, and hence the absolute rotation angle (−586 degrees) depicted in the list of FIG. 9 can be obtained as −46−180×3=−586 degrees from the detection output values of the small steering angle and the large steering angle based on a calculation by a microcomputer without using a memory table corresponding to each detection output value of the small steering angle and each detection output value of the large steering angle.

Figure 10:
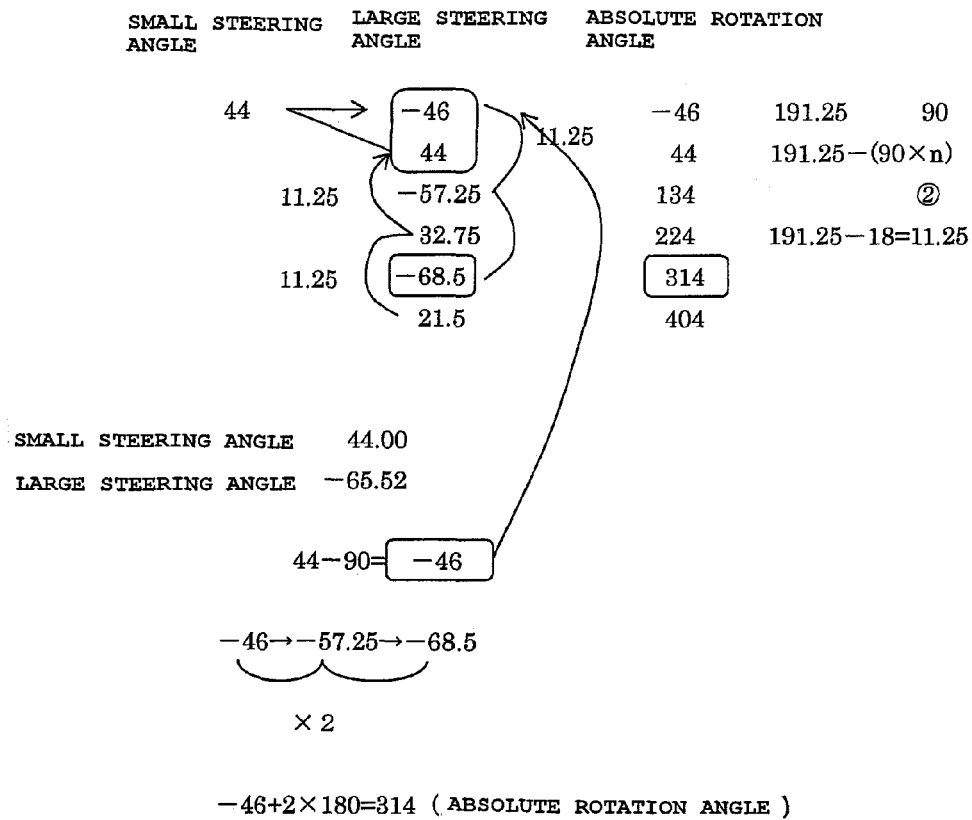
FIG. 10 is an explanatory drawing showing a method of calculating an absolute rotation angle from detection outputs of a small steering angle and a large steering angle based on a calculation without using a memory table.

FIG. 10 is a view for explaining another example of the method of uniquely obtaining an absolute rotation angle from the acquired detection output value of the small steering angle and the detection output value of the large steering angle. In this case, when the small steering angle is 44 degrees and the large steering angle is −46 degrees, the absolute rotation angle is defined as −46 degrees. As shown in FIG. 10, for example, a description will be given on a case where the absolute rotation angle is calculated when the small steering angle is detected as 44 degrees from an output from the coil cores 50 and the large steering angle is detected as −68.5 degrees from an output from the MR element 62. In this case, a value of 11.25 degrees is subtracted from −46 degrees of the large steering angle to calculate the number of times of subtraction with respect to −68.5 degrees. Since −68.5 degrees of the large steering angle can be obtained when the value of 11.25 degrees is subtracted from −46 degrees of the small steering angle twice, the absolute rotation angle can be uniquely acquired as −46 degrees+(180×(the number of times of subtraction=2))=314 degrees.

As explained above, the rotation sensor 1 according to the present invention detects the rotation angle of the rotor 10 as the small steering angle every 90 degrees cycle through the coil cores 50 and the sensing portion 15, and also detects the rotation angle of the second gear 12 as the large steering angle every 191.25 degrees cycle through the magnet 61 and the MR element 62. That is, in the rotation sensor, the cycle of the first detection signal obtained from the rotor 10 as the main rotor, i.e., the shaft S and the cycle of the second detection signal acquired from the second gear 12 as the sub-rotor satisfy the above-explained cycle relational expression. As a result, when the cycles are defined as explained above, just acquiring the detection output of the small steering angle and the detection output of the large steering angle as shown in FIG. 9 enables accurately uniquely calculating the absolute rotation angle, thereby performing highly accurate absolute rotation angle detection superior in noise resistance.

It is to be noted that the coil cores cooperate with the sensing portion and the magnet cooperates with the MR element for the first and second detections in this embodiment, but the present invention is not restricted thereto, these members may be counterchanged, and any other magnetic flux detecting means, e.g., an AMR element, a hole element, or a GMR element may be of course used. Furthermore, although the coil core has the track-like shape as seen in plan, the present invention is not restricted thereto, and it may has a circular shape as seen in plan.

Figure 11:
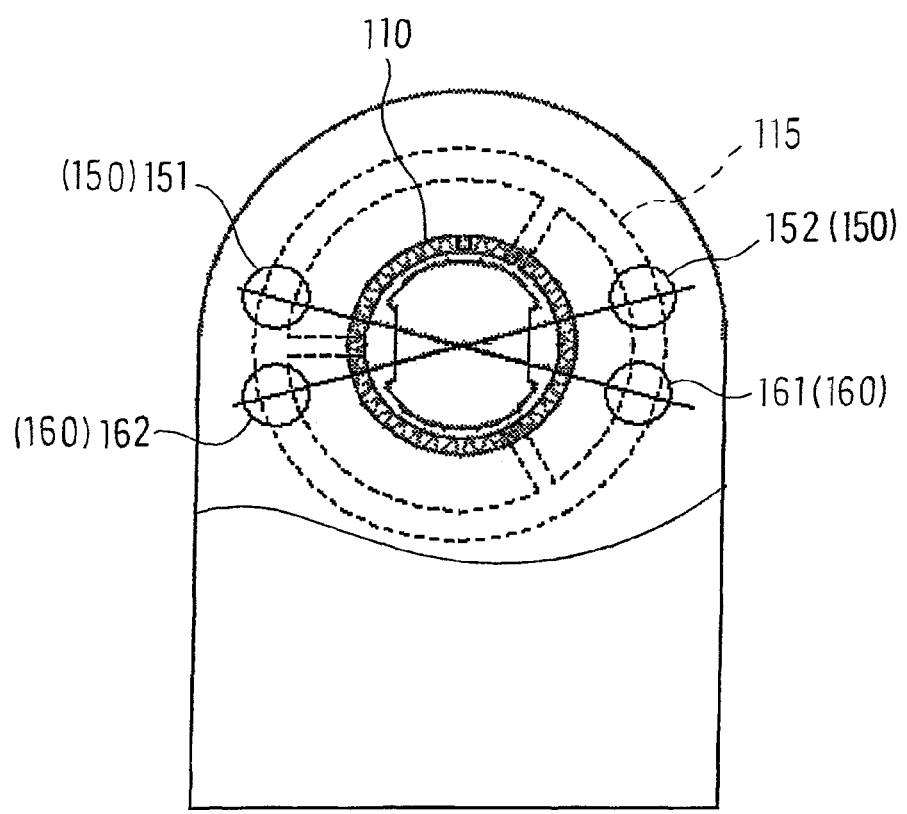
FIG. 11 is a plan view showing a rotation sensor according to a modification of the first embodiment of the present invention in a state where an upper case is depicted based on partial perspective.
Figure 12:
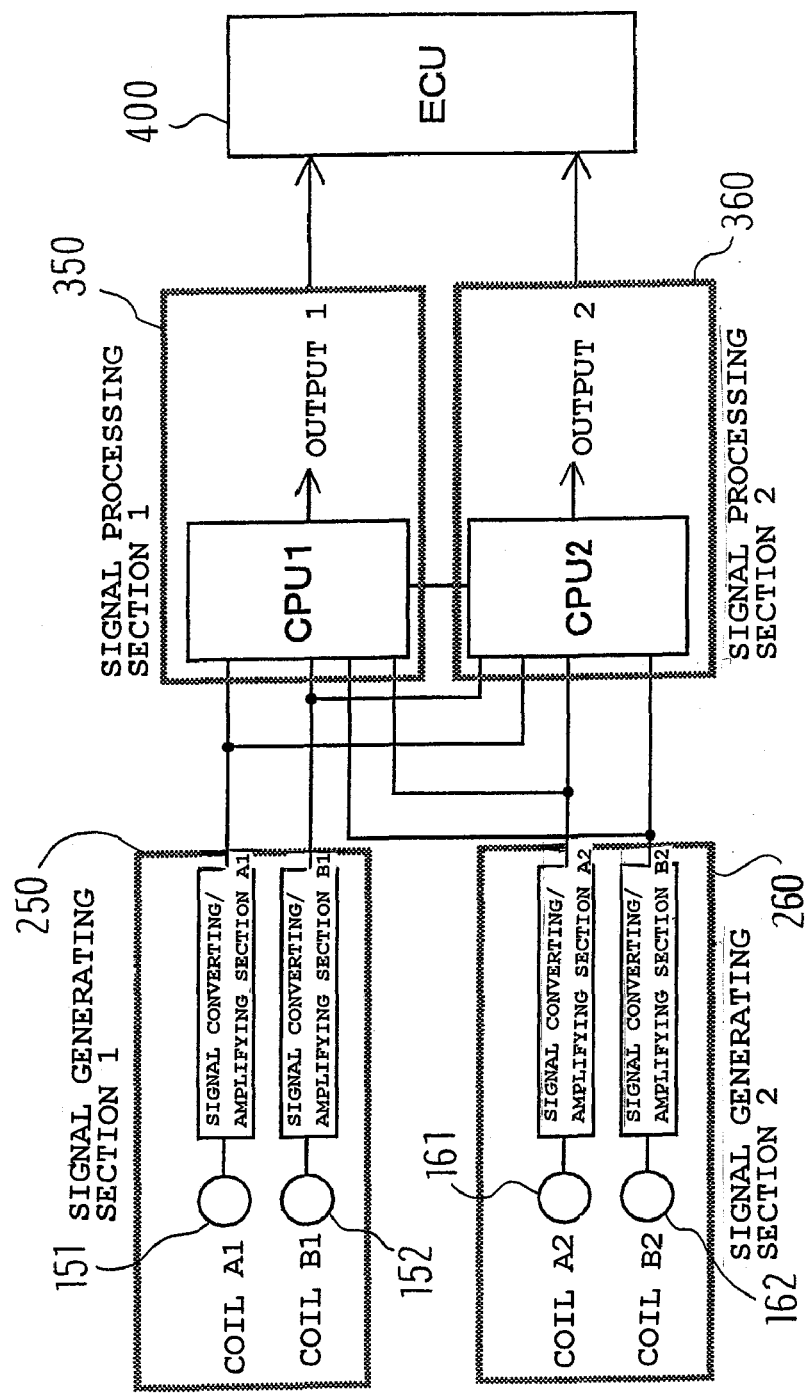
FIG. 12 shows a signal processing circuit according to the modification depicted in FIG. 11.

It is to be noted that the following modification of the foregoing embodiment can be also considered. According to this modification, as shown in FIGS. 11 and 12, one pair of coil cores 150 (a coil 151 as a coil A1 and a coil 152 as a coil B1) are arranged at appropriate positions on a sensing portion 115, and the other pair of coil cores 160 (a coil 161 as a coil A2 and a coil 162 as a coil B2) are arranged at appropriate positions on the sensing portion 115 different from the positions of the coil cores 150. Here, FIG. 11 shows a rotor 110, the sensing portion 115, and the coil cores 150 and 160 alone, and a sensing width of this sensing portion 115 is fixed in a circumferential direction in FIG. 11, but a cycle of a change in the sensing width may be actually divided into three in the sensing portion circumferential direction so that one cycle becomes 120 degrees, or it may be divided into four in the sensing portion circumferential direction so that one cycle becomes 90 degrees, or it may be divided into five in the sensing portion circumferential direction so that one cycle becomes 72 degrees, or it may be uniformly divided in the sensing portion circumferential direction so that one cycle becomes arbitrary degrees.

It is to be noted that, like the foregoing embodiment, a core main body used in the coil cores is formed of a mixed soft magnetic material obtained by mixing Mn—Zn-based soft magnetic material ferrite in polyphenylene sulfide. In this case, the core main body is formed by injection molding, and its magnetic powder filling ratio is approximately 50 weight %. When the soft magnetic material containing soft ferrite is subjected to injection molding with such a filling ratio to form the core main body, a degree of freedom in designing a shape of the core can be improved since molding is easy.

Alternatively, the core main body may be formed of a mixed soft magnetic material obtained by mixing Fe—Si—Al-based Sendust in an epoxy resin. In this case, the core main body is formed by powder compacting molding, and its magnetic powder filling ratio is equal to or above 90 weight %. When the soft magnetic material containing Sendust is subjected to powder compacting molding with such an injection ratio to form the core main body, a magnetic permeability can be increased to improve detection characteristics. Moreover, temperature characteristics of the magnetic permeability can be improved so that the rotation sensor can be used in an environment having a wide temperature range.

Additionally, the one pair of coil cores 150 (the coil A1 and the coil B1) are arranged to be shifted from each other in the circumferential direction of the sensing portion 115 as explained below. Specifically, assuming that the number of times of repeating a change in the width of the sensing portion 115 per 360 degrees in the circumferential direction of the sensing portion 115 is determined as a division number and S=360 degrees/the division number, an angle θ of the one pair of arranged coil cores in the circumferential direction is defined as θ=n×S+S/4 (where n is an integer). Likewise, the other pair of coil cores 160 are arranged to be shifted from each other in the circumferential direction of the sensing portion 115 to form this angle θ.

Further, FIG. 12 shows a signal processing circuit in this modification, and signal generating sections 250 and 260 function to amplify signals detected by the coil cores 150 and 160 to be output to signal processing sections 350 and 360. Furthermore, the signal processing sections 350 and 360 process the input signals by using respective CPUs and output obtained data to an ECU 400. Moreover, the ECU 400 serves to detect a rotation angle of the rotor by using the input data.

With such a configuration of the modification, confirming output data based on the signal from the one pair of coil cores and output data based on the signal from the other pair of coil cores enables assuring redundancy when detecting a rotation angle of the main rotor.

As explained above, the rotation sensor according to the conventional technology detects a rotation angle of the main rotor by using the rotor whose width varies in the rotating direction and the coil cores, includes the Geneva gear which is coupled with the main rotor to rotate in order to measure a rotation angle of the main rotor which is equal to or above 360 degrees, and uses the rotor whose width varies in the rotating direction and the coil cores to detect rotation of the Geneva gear.

However, the rotation sensor according to the first embodiment of the present invention does not use such a Geneva gear. That is, the sub-rotor coupled with the main rotor through the gear is provided, the magnet is provided to the sub-rotor in place of the Geneva gear, the sensor element which detects a change in a magnetic flux, e.g., the MR element is provided to the fixing member, and a combination of the magnet and the sensor element is utilized to detect a rotation angle of the sub-rotor. As explained above, based on the method of detecting rotation of the main rotor by the electromagnetic induction method and detecting a change in the magnetic flux by utilizing the combination of the magnet and the sensor, rotation of the sub-rotor is detected, and a rotation angle of the main rotor which is in the range of 360 degrees or above is calculated by using the two types of signals.

Additionally, with such a structure of the rotation sensor according to the first embodiment of the present invention, it is possible to eliminate the drawback of the conventional rotation sensor including the Geneva gear, i.e., the drawback that gradually outputting the number of revolutions of the main rotor in accordance with each number of revolutions by utilizing the Geneva gear, the conduction layer, and the detection coils makes it difficult to detect the number of revolutions of the main rotor when a difference between output stages associated with each number of revolutions of the main rotor is small.

Further, when a detection angle is wide, many step-like signals are required to increase a size of the mechanism portion in the Geneva method, which is disadvantageous in miniaturization, but the method according to the present invention enables miniaturization.

Furthermore, in the rotation sensor according to the first embodiment of the present invention, it is also possible to solve the problem in a reduction in vibration resistance of the rotation sensor itself due to a possibility of rotation of the Geneva gear by, e.g., vibration which is another drawback of the rotation sensor according to the conventional technology.

Moreover, the rotation sensor according to the first embodiment of the present invention can also solve the problem of assembling properties and a cost which is still another drawback of the rotation sensor according to the conventional technology, i.e., a drawback that assembling properties of the rotation sensor itself are poor and a drawback that a cost for components and the number of assembling steps is increased since positioning of components is not easy when the rotor whose width varies depending on the rotating direction is provided to the Geneva gear and the pairs of the coils and the core are provided to sandwich the rotor.

A rotation sensor according to a second embodiment of the present invention will now be explained with reference to the accompanying drawings. It is to be noted that, in this embodiment, likewise, a rotation sensor 1 as one conformation of the rotation sensor is used and this rotation sensor 1 is disposed to a steering shaft in relation to a steering device of a car to detect a rotation angle of a steering wheel.

As shown in FIGS. 1 and 2, the rotation sensor 1 according to the second embodiment of the present invention includes a rotor 10 which is fitted in a steering shaft S (which will be simply referred to as a "shaft S" hereinafter) as a rotor to be measured and provided with a first gear 11, a second gear 12 which meshes with the first gear 11 of the rotor 10, a lower case 21 which rotatably supports the rotor 10 and the second gear 12, and an upper case 22 which is fitted with the lower case 21 to form a box-like case 20.

The rotor 10 is formed of a synthetic resin superior in strength and moldability, stays 15a are extended from predetermined positions on a periphery of the rotor 10, and a tabular sensing portion 15 having a board thickness of, e.g., approximately 0.5 mm is annularly provided around the rotor 10 via the stays 15a. It is to be noted that the sensing portion 15 is formed of an electroconductive member, e.g., brass, silver, aluminum, or copper, and its width regularly varies from, e.g., 2 mm to 5 mm every 90 degrees in a circumferential direction in this embodiment. When the width of the sensing portion 15 varies every 90 degrees in this manner, a large change in a detection signal from coil cores 50 for an actual rotation angle of the rotor 10 can be assured.

Additionally, the upper case 22 and the lower case 21 are formed of a shielding material made of a metal or an insulating magnetic material having excellent strength and shielding properties for an alternating-current magnetic field, and the upper case 22 and the lower case 21 cooperate with each other to form a box body in which the rotor 10, the sensing portion 15, or the second gear 12 is accommodated. Further, the lower case 21 includes a connector 25 which supplies power to the rotation sensor 1 or transmits a detection signal from the rotation sensor 1 to the outside.

Furthermore, as shown in FIGS. 1 and 3, two pairs of coil cores 50 are disposed to the upper case 22 and the lower case 21 to face a sensing surface of the sensing portion 15 of the rotor 10 with a predetermined gap therebetween. It is to be noted that the sensing portion 15 and the coil cores 50 cooperate with each other to constitute first detecting means.

Figure 4:
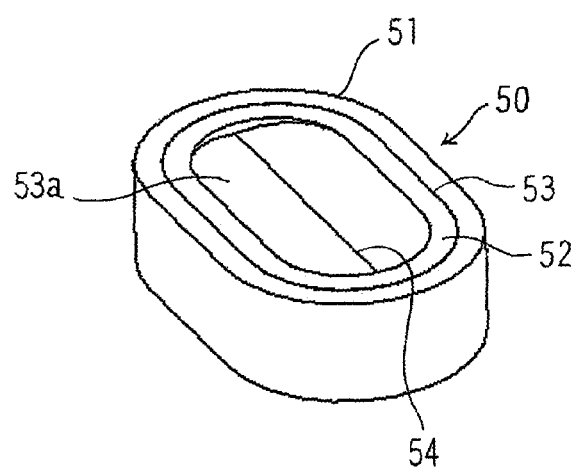
FIG. 4 is an enlarged perspective view showing one of the coil cores depicted in FIG. 3.

As shown in FIG. 1, the two pairs of coil cores 50 are disposed at predetermined angles in the circumferential direction of the sensing portion 15 in such a manner that output values of later-explained phase shift amounts are shifted from each other by 22.5 degrees and, as shown in FIGS. 3 and 4, each outer rim thereof has a so-called track-like shape for athletic sports as seen in the plan view of FIG. 1. It is to be noted that the coil core 50 includes a core main body 51 formed of an insulative soft magnetic material, e.g., a plastic magnet (e.g., a mixed soft magnetic material obtained by mixing Mn—Zn-based soft magnetic ferrite in PPS (polyphenylene sulfide)), and an exciting coil 52 which is wound around a track-like coil accommodation groove 55 formed along an outer peripheral portion of the core main body 51 and accommodated in the core main body 51.

Figure 5:
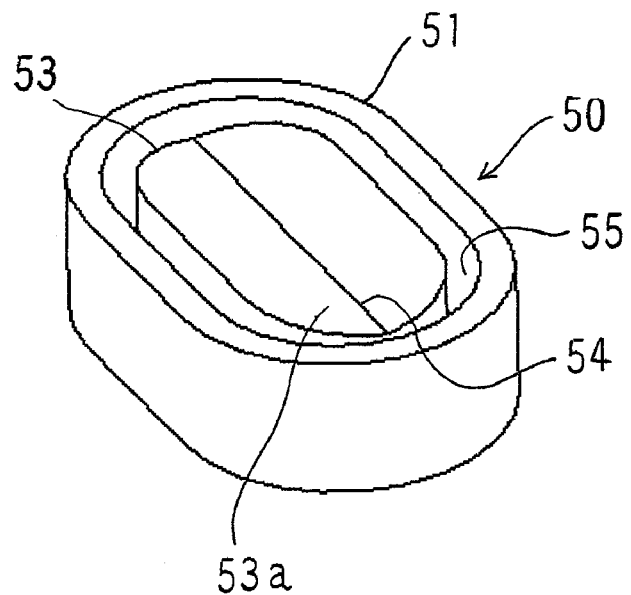
FIG. 5 is a perspective view showing a state where an exciting coil is eliminated from the coil core depicted in FIG. 4.

Moreover, as show in FIG. 5, a coil winding protruding portion 53 whose outer peripheral portion likewise has a track-like shape as seen from a sensing portion side is formed in the coil accommodation groove 55 which has a track-like shape and used for coil winding. Additionally, a tapered portion 53a which is inclined along an extending direction of the sensing portion 15 is formed on an upper surface of this coil winding protruding portion 53, i.e., a surface facing the sensing portion 15. This tapered portion 53a is formed in such a manner that the upper surface of the coil winding protruding portion 53 becomes concave from both ends of the coil winding protruding portion 53 in a widthwise direction toward a central part of the same in the widthwise direction. That is, a groove portion 54 which has a small depth as seen in a cross section along a longitudinal direction of the coil winding protruding portion 53 and a V-like shape as seen in the cross section of the same is formed in a direction perpendicular to the extending direction of the sensing portion 15.

Additionally, exciting coils 52 facing each other are connected in series and electrically connected with a printed board of a non-illustrated rotation angle detecting portion in the case 20. Further, when an alternating exciting current flows through the exciting coils 52 facing each other, an alternating-current magnetic field is circumferentially formed, and the alternating-current magnetic field crosses the sensing surface of the sensing portion 15 between each pair of core main bodies 51.

Further, although an eddy current occurs in the sensing portion 15 formed of an electroconductive member due to the alternating-current magnetic field produced from the coil cores 50, the generated eddy current varies in accordance with a change in the width of the sensing portion 15 associated with rotation of the rotor 10, an impedance fluctuation based on this change in the eddy current is detected, and each coil core 50 detects a rotation angle of the rotor 10 with a cycle of 90 degrees.

It is to be noted that each pair of coil cores 50 are arranged to face each other with the sensing portion 15 therebetween because an output from each coil core 50 fluctuates when a position of the rotor 10 fluctuates in an axial direction of the shaft S due to, e.g., vibration, but an output from one coil core 50 is increased while an output from the other coil 50 is reduced, and hence detecting the outputs from the two opposed coil cores 50 enables offsetting an output fluctuation of each coil core 50.

A signal processing method of detecting a rotation angle of this rotor 10 is as follows. It is to be noted that a drawing of each circuit configuration will be omitted. First, an oscillation circuit outputs an oscillation signal having a specific frequency to a phase shift portion made up of a resistor, the exciting coil 52, and a capacitor through a frequency division circuit. At this time, an impedance of each exciting coil 52 varies in accordance with a magnitude of occurrence of an eddy current in the sensing portion 15, and a phase of a voltage signal at each of both ends of each capacitor also changes due to this variation of the impedance. Moreover, the voltage signal at each of both ends of the capacitor is output to a phase shift amount detecting portion, and the detecting portion detects a phase shift amount of the voltage signal at each of both ends of each capacitor. Additionally, a converter converts the detected phase shift amount into a corresponding voltage value.

It is to be noted that the coil cores 50 are arranged in the circumferential direction of the sensing portion 15 in the case 20 in such a manner that phases of phase shift amount output signals obtained when the respective coil cores 50 cooperate with the sensing portion 15 are shifted 22.5 degrees in this embodiment, and hence the above-explained signal processing enables obtaining output values of phase shift amounts in a cycle of 90 degrees having phases shifted 22.5 degrees like a phase shift amount output value SA from one coil core 50 and a phase shift amount output value SB from the other coil core 50 as shown in FIG. 6(a).

A method of detecting a rotation angle of the rotor 10 from the thus obtained phase shift amount output values in the cycle of 90 degrees is as follows.

As shown in FIG. 6(a), an output value (SA, SB) of a rotation angle of the rotor 10 obtained from each coil core 50 is superimposed on an output value (RSA, RSB) obtained by inverting the former output value respectively. Further, a judgment is made upon which one of the ranges of 0 degree to 22.5 degrees, 22.5 degrees to 45 degrees, 45 degrees to 67.5 degrees, and 67.5 degrees to 90 degrees a rotation angle of the rotor 10 belongs to from a magnitude relationship of the respective phase shift amount detection values. Furthermore, linear parts of these four phase shift amount detection values are used, and the linear parts are jointed (coupled) to each other. Then, a rotation angle of the rotor 10 is obtained in the cycle of 90 degrees from an output signal having a sawtooth-like shape which varies in the cycle of 90 degrees depicted in FIG. 6(b) based on a result of the judgment on one of the four angle ranges the rotation angle belongs to.

On the other hand, as shown in FIGS. 1 and 2, the lower case 21 includes a magnet 61 which integrally rotates with the second gear 12 around a central part of the second gear 12, and an MR element (a magnetic flux detection element) 62 which detects a magnetic flux of this magnet 61 at a part of the lower case 21 facing the magnet 61. Moreover, this magnet 61 and the MR element 62 cooperate with each other to constitute second detecting means.

Detection output values from the MR element 62 are obtained as an sin curve-like detection output and a cos curve-like detection output, and these detection output values are converted into a detection output of a tan function to be output as an output signal having a sawtooth-like waveform which varies in a cycle of 191.25 degrees as shown in FIG. 8. It is to be noted that this signal processing method is well known as disclosed in, e.g., Japanese patent Application Laid-open No. 2004-53444.

The cycle of the detection output from the MR element 62 is 191.25 degrees in this manner because the number of teeth of the first gear 11 provided to the rotor 10 is 80 and the number of teeth of the second gear 12 is 85 in this embodiment, and hence the cycle of a detection signal from the MR element 62 detected in accordance with rotation of the second gear 12 is 180 degrees×85/80=191.25 degrees based on a relationship of these numbers of teeth.

As explained above, in the rotation sensor 1 according to this embodiment, a first detection signal obtained from the first detecting means constituted of the coil cores 50 and the sensing portion 15 in cooperation with each other is output in the cycle of 90 degrees in accordance with rotation of the rotor 10, and a second detection signal obtained from the second detecting means constituted of the magnet 61 and the MR element 62 in cooperation with each other is output in the cycle of 191.25 degrees in accordance with rotation of the second gear 12, but each of the following relationships must be satisfied in the period of these detection signals in the rotation sensor 1 according to the present invention.

First, as a first relationship which should be satisfied by the cycle of each detection signal, a relationship of $(Tm-Tc\times i)\times n=Tm$ (i and n are positive integers) is satisfied, where a cycle of a detection signal of the coil cores (the first detecting means) 50 is Tc and a cycle of a detection signal of the MR element (the second detecting means) 62 is Tm. When such a relationship is satisfied, a resolution for detection of an absolute rotation angle of the rotor 10, i.e., the shaft S to be measured is improved, and noise resistance is enhanced. It is to be noted that, in case of the rotation sensor 1 according to this embodiment, when Tc=90 degrees, Tm=191.25 degrees, i=2, and n=17, $(191.25-90\times2)\times17=191.25$ is achieved, thereby satisfying the above-explained relational expression.

Additionally, in respective multiples obtained by multiplying the cycle Tm and the cycle Tc by different positive integers, assuming that a common minimum multiple is Tx, a relationship of $Tx \geqq 1440$ degrees is satisfied. When such a relationship is satisfied, a plurality of absolute rotation angle solutions of the rotor 10, i.e., the shaft S associated with combinations of two output values obtained from the coil cores 50 constituting the first detecting means and the MR element 62 constituting the second detecting means can be avoided from being produced in the measurement range of ±720 degrees, and an absolute rotation angle of the rotor 10, i.e., the shaft S can be assuredly and uniquely obtained from an output value of the coil cores 50 and an output value of the MR element 62.

A method of measuring an absolute rotation angle of the shaft S using the rotation sensor 1 will now be explained. In the rotation sensor 1 according to this embodiment, since the cycle of the detection signal from the coil cores 50 and the cycle of the detection signal from the second gear 12 satisfy the special relationship, a correspondence relationship between the cycle of the output signal from the coil cores 50 associated with rotation of the rotor 10 and the cycle of the output signal from the MR element 62 provided in the second gear 12 is a relationship restricted to the analytical curves (not shown in this example) which are widely distributed at equal intervals within an absolute rotation angle to be measured. With such a relationship, as shown in FIG. 8, rotation signal detection values of the rotor 10 obtained from the coil cores 50 and the sensing portion 15 are alternately continuously output with a sawtooth-like waveform every 90 degrees in the range of −750 degrees to +750 degrees, and the cycles of the rotation angle detection outputs of the second gear 12 obtained from the MR element 62 and the magnet 61 are alternately continuously output with a sawtooth-like waveform every 191.25 degrees.

Therefore, the phase detected from the coil cores 50 and the sensing portion 15 is compared with the phase detected from the MR element 62 and the magnet 61, and an absolute rotation angle of the shaft S which integrally rotates with the rotor 10 can be uniquely and accurately obtained with a high resolution from a result of the comparison.

It is to be noted that, in the rotation sensor 1 according to this embodiment, the sensing portion opposed surface of the core main body 51 in the coil core 50 has the track-like shape and the sensing portion 15 is assembled to be shifted in the linear part of the track-like opposed surface of the core main body 51.

As a result, even if the sensing portion 15 is slightly shifted form the coil core 50 in a radial direction (which will be referred to as an "X axis direction" hereinafter) of the sensing portion 15 perpendicular to the extending direction of the sensing portion 15, a projection area of the sensing portion 15 with respect to the coil core 50 hardly varies. Consequently, even if the sensing portion 15 is slightly shifted in the X axis direction, a magnetic flux crossing the sensing portion substantially hardly varies, thereby suppressing an error in an output value of a rotation amount to be detected to the minimum level. Therefore, even if a dimensional tolerance of components or an assembling tolerance is allowed to some extent, a rotation amount can be stably detected without being affected by such a tolerance. Further, even if the rotation sensor is mounted in a place, e.g., a car to which vibration is applied, an influence of a change in a relative position of the sensing portion and the detecting portion due to the vibration can be reduced. Furthermore, even if the relative position of the sensing portion and the detecting portion varies due to, e.g., an aged change, this influence can be reduced.

Moreover, a coil winding protruding portion 53 around which the exciting coil 52 is wound is formed in the core main body 51, and a tapered portion 53*a* which is inclined along the extending direction of the sensing portion 15 is formed in at least a part of a surface of the coil winding protruding portion 53 facing the sensing portion 15.

When such a tapered portion 53*a* is formed, even if a gap between the sensing portion 15 and the sensing portion opposed surface of the core main body 51 is shifted, a magnetic flux cutting across the sensing portion 15 substantially hardly varies, and an error in an output value of a rotation amount to be detected can be consequently suppressed to the minimum level even though the sensing portion 15 is slightly shifted from the coil core 50 in a direction vertical to the sensing surface, i.e., an axial direction (which will be referred to as a "Z axis direction" hereinafter) of the rotor 10. Therefore, a rotation amount can be stably detected without being affected by a dimensional tolerance of components or an assembling tolerance. Additionally, for example, even if the rotation sensor is mounted in a place, e.g., a car to which vibration is applied, an influence of a change in a relative position of the sensing portion and the detecting portion due to vibration can be reduced. Further, even if a relative position of the sensing portion and the detecting portion varies due to, e.g., an aged change, this influence can be reduced.

Figure 13:
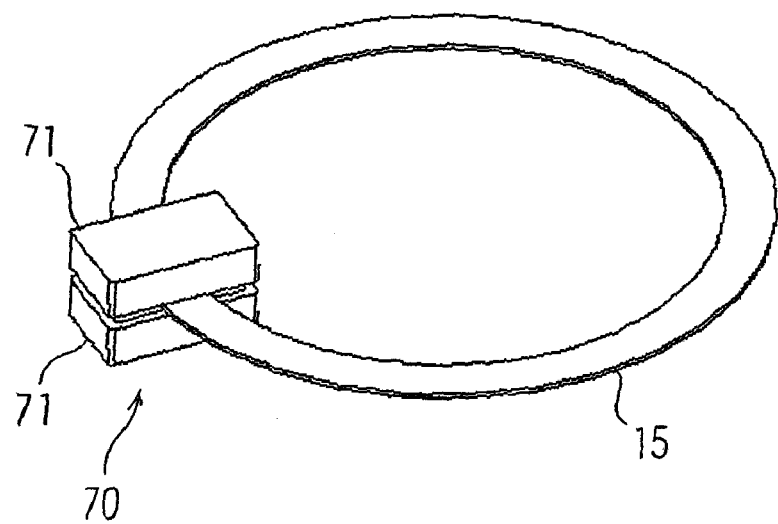
FIG. 13 is a perspective view showing coil cores according to a modification of a second embodiment of the present invention together with an annular sensing portion.

It is to be noted that the coil core may have a shape like a coil core 70 of a modification depicted in FIG. 13 in place of having the so-called track-like shape for athletic sports at each outer rim as seen in the plan like the coil core 50. That is, a sensing portion opposed surface of a core main body 71 in the coil core 70 depicted in this drawing has a rectangular shape in which a direction perpendicular to an extending direction of a sensing portion 15 is a longitudinal direction, and the sensing portion 15 may be assembled to be shifted in the longitudinal direction within a rectangular opposed surface of the core main body.

When the coil core has such a shape, like the foregoing embodiment, even if the sensing portion 15 is slightly shifted from the coil core 70 in a radial direction (the X axis direction) of the sensing portion 15 perpendicular to the extending direction of the sensing portion 15, a projection area of the sensing portion 15 with respect to the coil core 70 hardly varies. As a result, even if the sensing portion 15 is slightly shifted in the X axis direction, a magnetic flux crossing the sensing portion substantially hardly varies, thereby suppressing an error in an output value of a rotation amount to be detected to the minimum level. Therefore, even if a dimensional tolerance of components or an assembling tolerance is allowed to some extent, a rotation amount can be stably detected without being affected by such a tolerance. Further, even if the rotation sensor is mounted in a place, e.g., a car to which vibration is applied, an influence of a change in a relative position of the sensing portion and the detecting portion due to the vibration can be reduced. Furthermore, even if the relative position of the sensing portion and the detecting portion varies due to, e.g., an aged change, this influence can be reduced.

EXAMPLES

Subsequently, the rotation sensor 1 as an example of the rotation sensor according to the present invention was used to confirm superiority provided by forming each coil core 50 in the rotation sensor 1 into the above-explained special shape based on comparison with the conventional coil core 150 whose surface facing the sensing portion 15 has a circular shape, and this will be explained as an example hereinafter.

Figure 14:
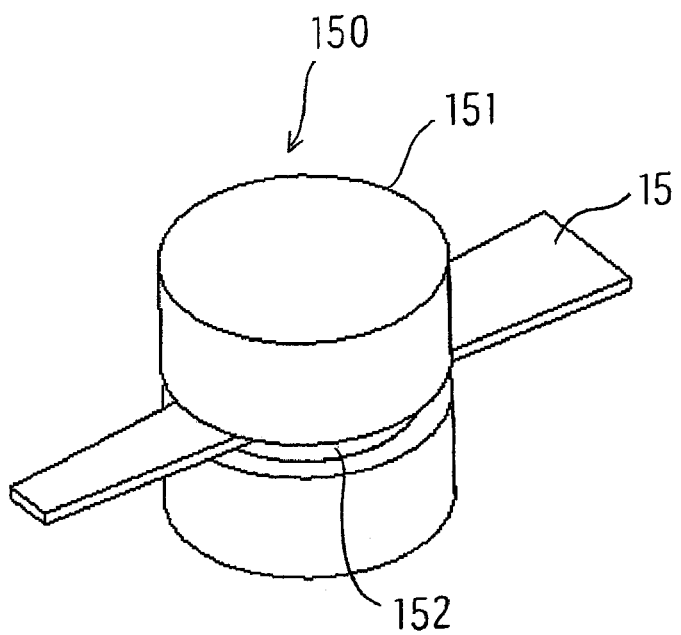
FIG. 14 is a perspective view showing an attachment positional relationship of coil cores according to a comparative example of the second embodiment of the present invention and a sensing portion, each coil core having a circular rim of a surface facing the sensing portion.

It is to be noted that, in this example, the coil core 50 used in the rotation sensor 1 according to the present invention is determined as this example, and the coil core 150 in which an outer peripheral portion of an opposed surface of a core main body 151 facing a sensing surface of the sensing portion 15 depicted in FIG. 14 has a circular shape is determined as a comparative example.

Moreover, as Example 1, an error in a detection output value in this example was compared with that in the comparative example in a case where the sensing portion 15 has a normal positional relationship with respect to the coil core 50 or 150 and a case where the sensing portion 15 is slightly shifted from the coil core 50 or 150 in the X axis direction (which is a direction vertical to an extending direction of the sensing portion 15 and also a radial direction of the sensing portion 15).

Additionally, as Example 2, an output error in this example is compared with that in the comparative example based on a detection output value when the sensing portion 15 is arranged between the coil cores with a normal gap and a detection output value obtained when the sensing portion 15 is slightly shifted in the Z axis direction (which is a direction vertical to the sensing surface of the sensing portion 15 and also a radial direction of a rotor 10).

Example 1

Figure 15:
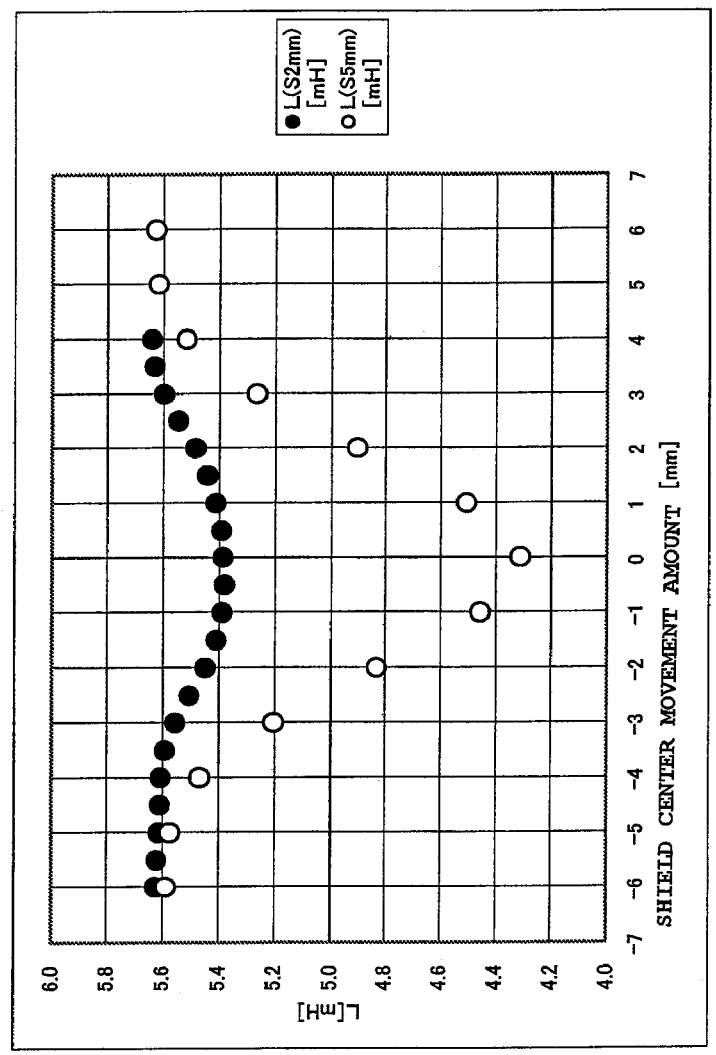
FIG. 15 is a measurement view showing detection output values at a part having a sensing width of 2 mm and a part having a sensing width of 5 mm when the sensing portion is shifted from the coil cores according to the comparative example in the second embodiment of the present invention in an X axis direction, i.e., a radial direction of the sensing portion perpendicular to an extended surface of the sensing portion.

FIG. 15 is a measurement view in which an abscissa represents a case where the coil core 150 having a circular shape as the comparative example is used to shift the sensing portion 15 in the X axis direction (a direction vertical to an extending direction of the sensing portion 15, i.e., a radial direction of the sensing portion 15) from a normal positional relationship (a shield center movement amount: 0 mm) of the coil core 150 and an ordinate represents an inductance as a detection output value measured at each shifted position. In this case, each plotted black circle represents a detection output value when the sensing portion 15 is shifted at a position where the sensing portion 15 has a width of 2 mm, and each plotted white circle represents a detection output value when this sensing portion 15 is shifted at a position where the sensing portion 15 has a width of 5 mm.

As apparent from this measurement result, it was revealed that an output error occurs by shifting the sensing portion 15 from the coil core 150 in the X axis direction when the width of the sensing portion 15 is 2 mm but this output error becomes considerably large by shifting this sensing portion from the coil core in the X axis direction when the width of the sensing portion is 5 mm in particular.

Figure 16:
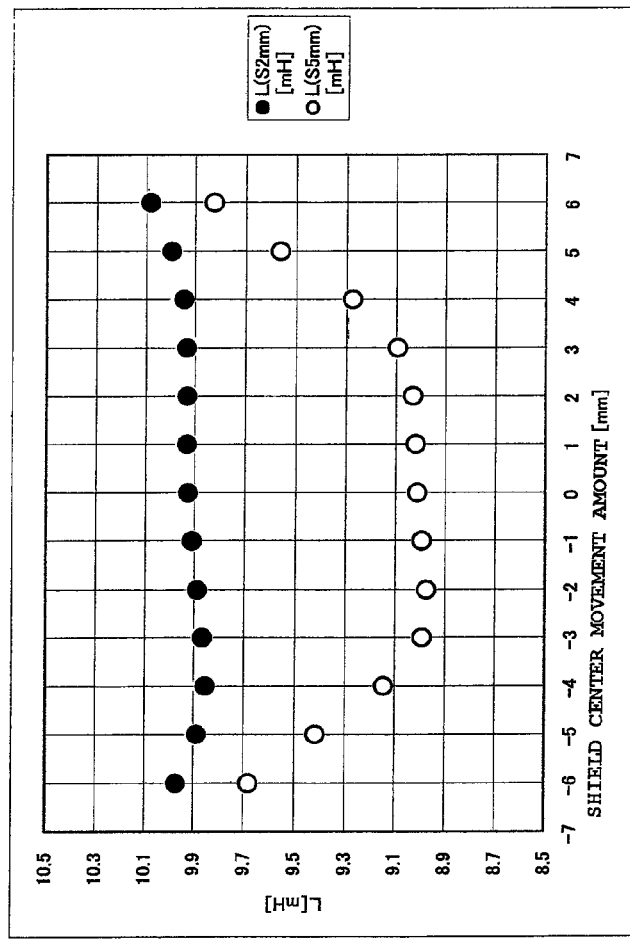
FIG. 16 is a measurement view showing detection output values at a part having a sensing width of 2 mm and a part having a sensing width of 5 mm when the sensing portion is shifted from the coil cores according to the second embodiment of the present invention in the X axis direction, i.e., the radial direction of the sensing portion perpendicular to the extended surface of the sensing portion.

FIG. 16 shows a measurement result associated with FIG. 15, and it is a measurement view in which an abscissa represents a case where the track-like coil core 50 as this example is used to shift the sensing portion 15 in the X axis direction (a direction vertical to an extending direction of the sensing portion 15, i.e., a radial direction of the sensing portion 15) from a normal positional relationship of the coil core 50 (a shield center movement amount: 0 mm) and an ordinate represents an inductance as a detection output value measured at each shifted position. In this case, each plotted black circle represents a detection output value when the sensing portion 15 is shifted at a position where the sensing portion 15 has a width of 2 mm, and each plotted white circle represents a detection output value when this sensing portion 15 is shifted at a position where the sensing portion 15 has a width of 5 mm.

As apparent from this measurement result, it was revealed that an output error does not occur unless the sensing portion 15 is greatly shifted from the coil core 50 in the X axis direction when the width of the sensing portion 15 is 2 mm and the output error rarely occurs when the sensing portion 15 is just shifted from the coil core 50 in the X axis direction to some extent when the width of the sensing portion 15 is 5 mm.

Figure 17:
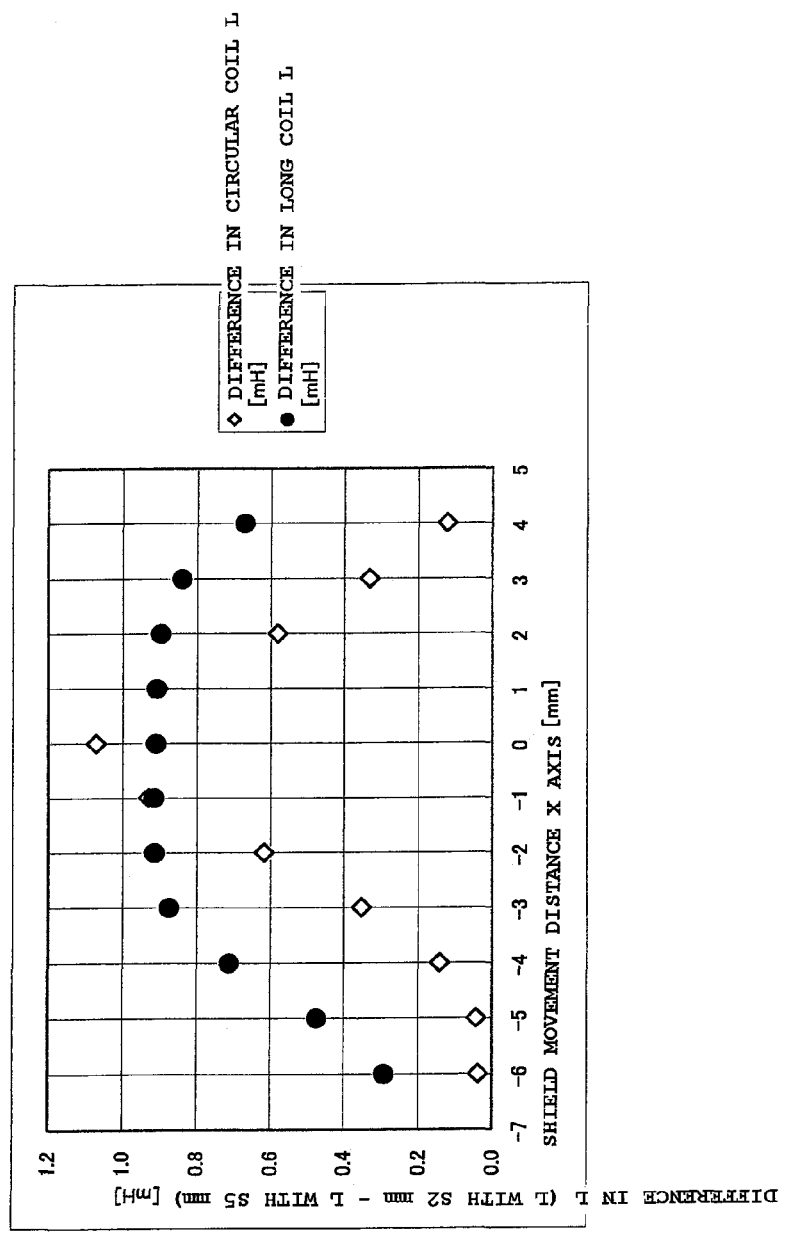
FIG. 17 shows a comparison result obtained by calculating an output difference in the detection output values at the parts of the sensing portion having the width of 2 mm and the width of 5 mm at the shifted positions of the sensing portion with respect to the respective coil cores according to the second embodiment and the comparative example in accordance with the coil cores of the second embodiment of the present invention and the coil cores of the comparative example.

FIG. 17 shows comparison between each output difference (plotting of each rhombus) which is a difference between a detection output value when the sensing portion 15 has a width of 2 mm and a detection output value when the sensing portion has a width of 5 mm in each shift amount of the sensing portion 15 depicted in FIG. 15 showing the comparative example and each output difference (plotting of each black circle) which is a difference between a detection output value when the sensing portion 15 has a width of 2 mm and a detection output value when the sensing portion has a width of 5 mm in each shift amount of the sensing portion 15 in FIG. 16 showing this example.

This drawing shows that, even though a shift amount of the sensing portion 15 in the X axis direction is increased because of characteristics of this portion, an accurate rotation angle can be detected if an output difference between a detection output value when the sensing portion 15 has the width of 2 mm and a detection output value when the sensing portion 15 has the width of 5 mm is large in each shift amount. As apparent from this drawing, it was understood that this example indicated by plotting the black circles maintains a high output difference between the respective detection output values even if the sensing portion 15 is shifted to some extent. On the other hand, it was revealed that, in the comparative example, an output difference between the respective detection output values is precipitously reduced when the width of the sensing portion 15 is only slightly shifted.

Based on the above-explained results, the detection output values from the coil core 50 according to this example are very stable even though the sensing portion 15 is shifted from the coil core 50 in the X axis direction, i.e., the radial direction of the sensing portion 15 perpendicular to the extending direction of the sensing portion 15 as compared with the coil core 150 according to the comparative example. Consequently, it was understood that, even if displacement of the coil core 50 and the sensing portion 15 from a normal attachment positional relationship occurs in the X axis direction due to a component tolerance or an assembling tolerance of the rotation sensor 1, this example enables stable detection of rotation as compared with the comparative example.

It is to be noted that the present invention can be also applied as a displacement sensor which detects, e.g., a movement distance in a longitudinal direction when the sensing portion is linearly extended in the longitudinal direction rather than the circumferential direction, the width of this portion is changed in the extending direction, and the coil cores according to the present invention are provided to face this sensing portion. Furthermore, the sensing portion extended in the circumferential direction or the longitudinal direction may not only measure a rotation amount by changing its width in the extending direction but also measure a rotation amount by changing its thickness in the extending direction.

Example 2

Figure 18:
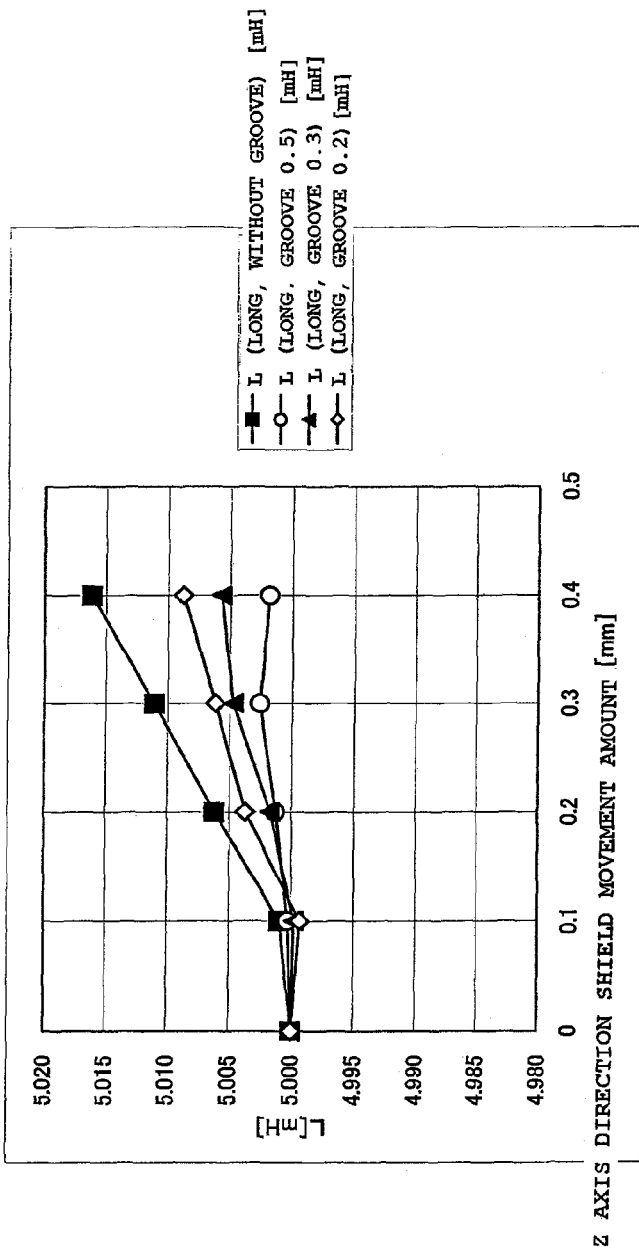
FIG. 18 is a measurement view obtained by measuring respective output detection values when the sensing portion is shifted in a Z axis direction, i.e., a direction perpendicular to a sensing surface of the sensing portion in a case where a concave portion is not formed in a coil winding protruding portion of the coil cores and a case where a concave portion constituting a groove portion having a depth of 0.2 mm, a concave portion constituting a groove portion having a depth of 0.3 mm, and a concave portion constituting a groove portion having a depth of 0.5 mm are formed according to the second embodiment of the present invention.

FIG. 18 is a measurement view in which an abscissa represents a case where a coil core 50 as this example whose coil winding protruding portion has a track-like upper surface is used to shift a sensing portion 15 in a Z axis direction (a direction vertical to a sensing surface of the sensing portion 15, i.e., a coil core direction of one of coil cores) from a normal positional relationship (a shield center movement amount: 0 mm) of the coil core 50 and an ordinate represents an inductance as a detection output value measured at each shifted position. In this case, each plotted black square corresponds to a comparative example of Example 2, and represents a shift amount and an inductance of a detection output value of the sensing portion 15 in the Z axis direction when a tapered portion 53a forming a concave portion, i.e., a groove portion 54 is not present on the upper surface of the coil winding protruding portion of the coil core 50.

Additionally, each plotted white rhombus corresponds to this example of Example 2, and represents a relationship between a shift amount of the sensing portion 15 in the Z axis direction and an inductance of a detection output value when the tapered portion 53a forming a concave part, i.e., the groove portion 54 having a depth of 0.2 mm is present on the upper surface of the coil winding protruding portion 53 of the coil core 50.

Further, each plotted black triangle corresponds to this example of Example 2, and represents a shift amount of the sensing portion 15 in the Z axis direction and an inductance of a detection output value when a moderate concave part, i.e., the groove portion 54 having a depth of 0.3 mm is present on the upper surface of the coil winding protruding portion 53 of the coil core 50.

Furthermore, each plotted white circle also corresponds to the example of Example 2, and represents a shift amount of the sensing portion 15 in the Z axis direction and an inductance of a detection output value when a deeply concave part, i.e., the groove portion 54 having a depth of 5 mm is present on the upper surface of the coil winding protruding portion 53 of the coil core 50.

As apparent from these measurement results, it can be understood that an error in an inductance of a detection output value with respect to a shift of the sensing portion 15 in the Z axis direction can be reduced as compared with a case where the coil core which does not have such a tapered portion 53a is used when the tapered portion 53a which is inclined along the extending direction of the sensing portion 15 like this example is provided on the upper surface of the coil winding protruding portion 53 in the coil core 50 facing the sensing portion 15. Moreover, it was revealed that an error in an inductance of a detection output value with respect to a shift of the sensing portion 15 in the Z axis direction is small when the groove portion 54 formed by the tapered portion 53a has the depth of 0.5 mm rather than 0.2 mm.

Figure 19:
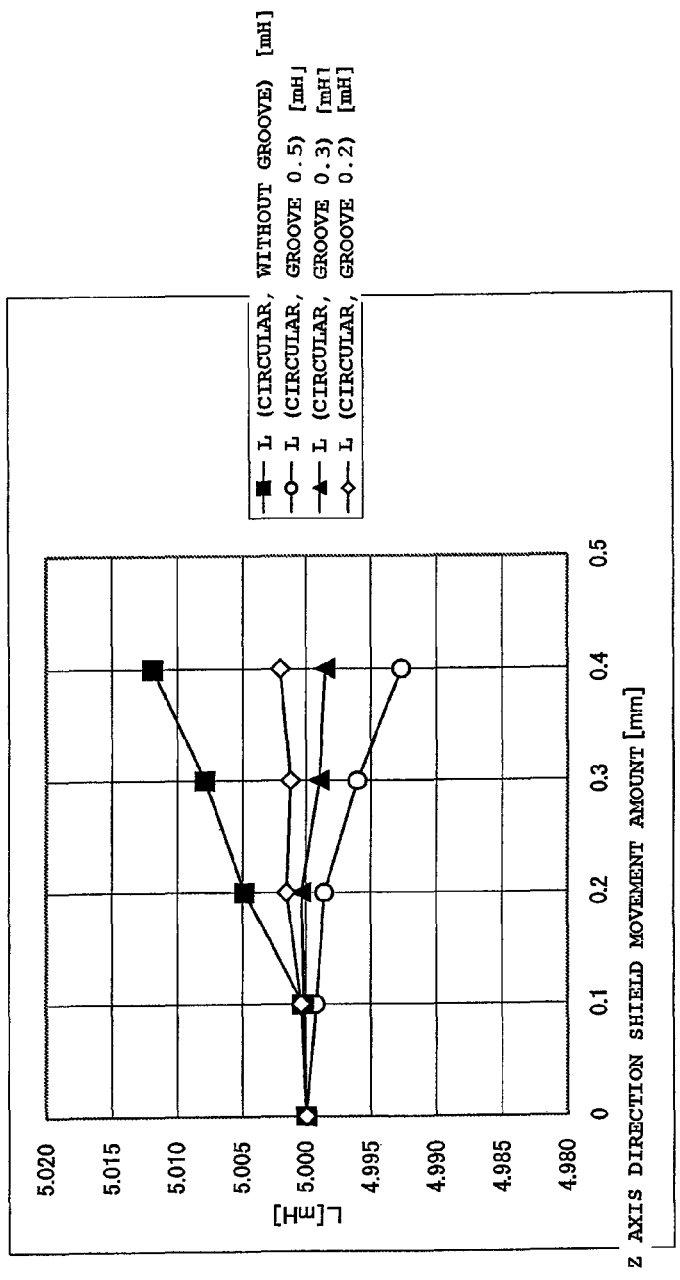
FIG. 19 is a measurement view obtained by measuring respective detection output values when the sensing portion is shifted in the Z axis direction, i.e., the direction perpendicular to the sensing surface of the sensing portion in a case where a concave portion is not formed in a coil winding protruding portion of the coil cores according to the comparative example and a case where a concave portion constituting a groove portion having a depth of 0.2 mm, a concave portion constituting a groove portion having a depth of 0.3 mm, and a concave portion constituting a groove portion having a depth of 0.5 mm are formed according to the second embodiment of the present invention.

FIG. 19 shows a comparison result of comparing a case where a circular coil core 150 as a comparative example like the coil core 50 as this example depicted in FIG. 18 is used and a tapered portion 163a forming a special concave part is provided on an upper surface of a coil winding protruding portion of this coil core (see FIG. 20) with a case where the concave part is not provided on the upper surface of the coil winding protruding portion like a simple comparative example.

Figure 20:
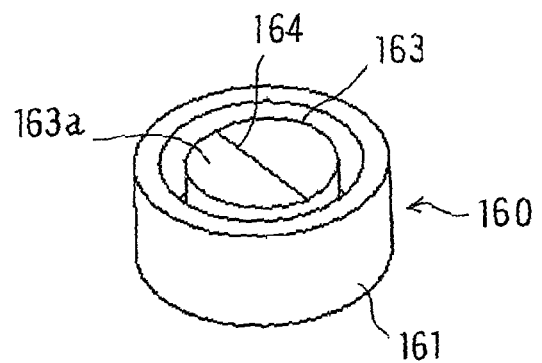
FIG. 20 is a perspective view showing a coil core concerning the coil cores according to the comparative example of the second embodiment of the present invention in which a tapered portion is formed on an upper surface of a coil winding protruding portion facing the sensing portion along an extending direction of the sensing portion.

As apparent from this comparison result, it was understood that, when a groove portion 164 which is formed of the tapered portion 163a inclined along an extending direction of a sensing portion 15 of a coil core 160 and has a V-like shape as seen from a cross section is provided in this comparative example as shown in FIG. 20, an output error in a detection output value rarely occurs even if the sensing portion 15 is slightly shifted in the Z axis direction as compared with the case where such a tapered portion 163a is not provided at all (an inductance of a detection output value plotted with each black square in FIG. 19). Incidentally, in this case, it was revealed that an output error in an inductance of a detection output value with respect to a shift of the sensing portion 15 in the Z axis direction hardly occurs when the groove portion 164 formed of the tapered portion 163a is not very deep and has, e.g., a depth of 0.2 mm or a depth of 0.3 mm.

The above-explained tapered portion does not have to be formed over the entire upper surface of the coil winding protruding portion of the coil core, and forming the tapered portion in at least a part of the upper surface can suffice.

It is to be noted that the present invention can be also applied as a displacement sensor which detects, e.g., a movement distance in a longitudinal direction when the sensing portion is linearly extended in the longitudinal direction rather than the circumferential direction, its width is changed in the extending direction, and the coil cores according to the present invention are provided to face the sensing portion. Moreover, the sensing portion extended in the circumferential direction or the longitudinal direction may not only measure a rotation amount when its width changes in the extending direction but also measure a rotation amount when its thickness varies in the extending direction.

Example 3

Figure 21:
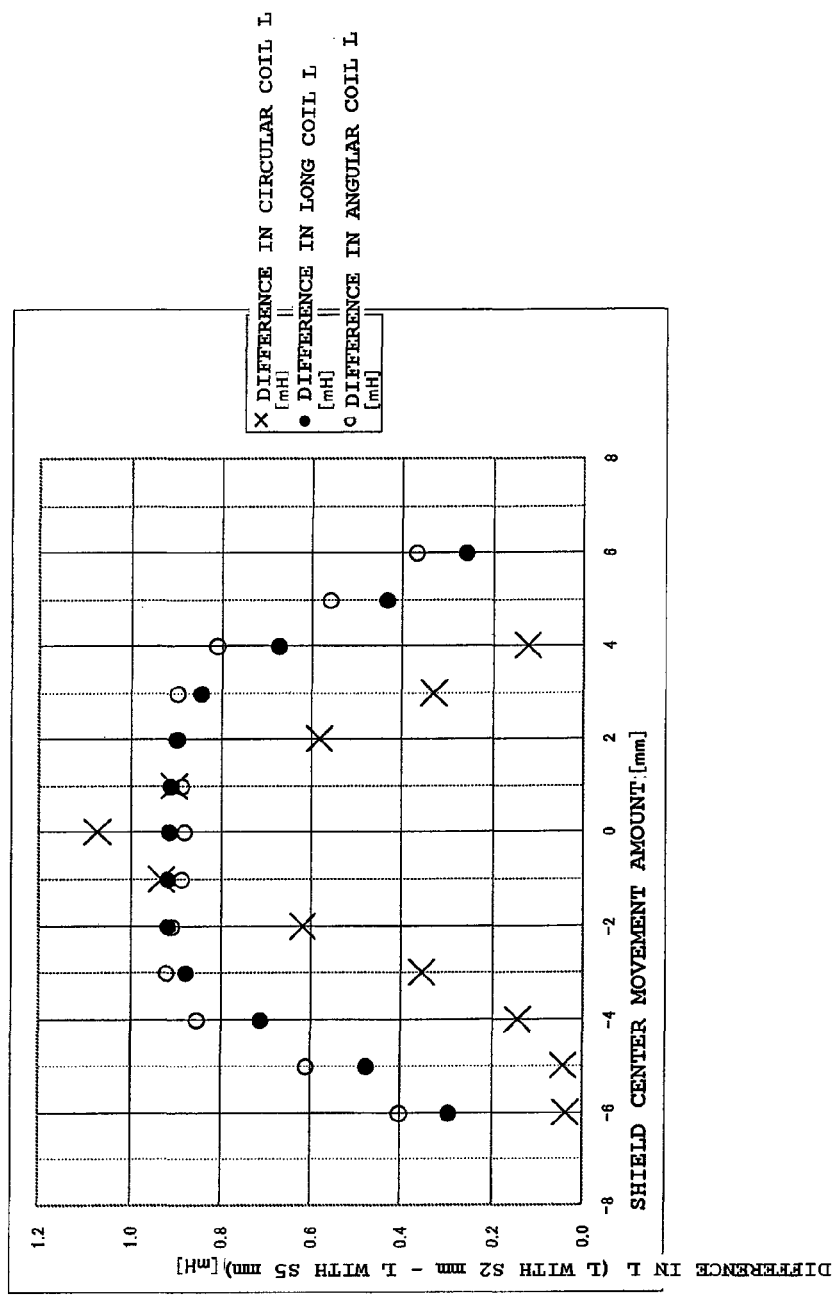
FIG. 21 shows a comparison result obtained by calculating an output difference between detection output values at the parts of the sensing portion having a width of 2 mm and a width of 5 mm at shifted positions of the sensing portion with respect to the respective coil cores according to the example, the comparative example, and the modification of the second embodiment of the present invention in accordance with the coil cores according to the example and the modification and the coil cores according to the comparative example.

FIG. 21 shows a comparison result obtained by calculating and adding an output difference between detection output values when the sensing portion 15 has a width of 2 mm and a width of 5 mm at shifted positions in accordance with the shifted positions of the sensing portion from the coil core 70 in the modification depicted in FIG. 13 as well as the comparison result shown in FIG. 17. Specifically, an output difference which is a difference between a detection output value when the sensing portion 15 has the width of 2 mm and a detection output value when the sensing portion has the width of 5 mm in each shift amount of the sensing portion 15 in the comparative example (see FIG. 15) was plotted in the form of a symbol × in FIG. 21, an output difference which is a difference between a detection output value when the sensing portion 15 has the width of 2 mm and a detection output value when the sensing portion has the width of 5 mm in each shift amount of the sensing portion 15 according to this example (see FIG. 16) was plotted in the form of a black circle in FIG. 21, an output difference which is a difference between a detection output value when the sensing portion 15 has the width of 2 mm and a detection output value when the sensing portion has the width of 5 mm according to this modification associated with these examples was plotted in the form of a white circle in FIG. 21, and these output differences were compared with each other.

Like FIG. 17, it can be understood from FIG. 21 that this modification indicated by plotting each white circle maintains a high output difference between the respective detection output values even if the sensing portion 15 is shifted to some extent like the example indicated by plotting each black circle. On the other hand, it was revealed that, in the comparative example, an output difference between the respective detection output values is precipitously reduced when the width of the sensing portion 15 is only slightly shifted.

It was understood from the above-explained comparison result that the detection output value from the coil core 70 according to this modification is very stable as compared with the coil core 150 according to the comparative example even if the sensing portion 15 is shifted from the coil core 70 in the X axis direction, i.e., the radial direction of the sensing portion 15 perpendicular to the extending direction of the sensing portion 15. As a result, it was revealed that this modification can stably detect a rotation angle as compared with the comparative example even if the coil core 70 and the sensing portion 15 are shifted in the X axis direction from a normal attachment positional relationship because of a component tolerance or an assembling tolerance of the rotation sensor 1.

It is to be noted that this modification can be applied as a displacement sensor which detects, e.g., a movement distance in the longitudinal direction when the sensing portion is linearly extended in the longitudinal direction rather than the circumferential direction, its width is changed in the extending direction, and the coil cores according to the present invention are provided to face the sensing portion. Additionally, the sensing portion extended in the circumferential direction or the longitudinal direction may not only measure a rotation amount when its width varies in the extending direction but also may measure a rotation amount when its thickness varies in the extending direction.

The above-explained rotation sensor according to the present invention is suitable for detection of a rotation angle of a steering device in a car. However, the rotation sensor according to the present invention can be applied to any device as long as it obtains a relative rotation angle or a rotation torque between rotary shafts which rotate like a robot arm.

The invention claimed is:

1. A rotation sensor comprising: a main rotor which integrally rotates with a rotor to be measured; a sub-rotor which rotates in accordance with rotation of the main rotor with the number of revolutions which is different from that of the main rotor; first detecting means for detecting rotation of the main rotor; and second detecting means for detecting rotation of the sub-rotor, the rotation sensor detecting an absolute rotation angle of the rotor to be measured from a detection signal from the first detecting means and a detection signal from the second detecting means, wherein the respective detection signals obtained from the first detecting means and the second detecting means are cyclically output in accordance with rotation of each rotor, and the following relationship is satisfied:

$(Tm-Tc \times i) \times n = Tm$ ($i$ and $n$ are positive integers)

where Tc is a cycle of the detection signal from the first detecting means, and Tm is a cycle of the detection signal from the second detecting means, wherein the following relationship is satisfied:

$Tx \geq 1440$ degrees where Tx is a common minimum one in respective multiples obtained by multiplying the cycle Tm and the cycle Tc by different positive integers.

2. The rotation sensor according to claim 1, wherein the cycle Tc of the detection signal of the main rotor is 90 degrees, and the cycle Tm of the detection signal of the sub-rotor is 191.25 degrees.

3. The rotation sensor according to claim 1, wherein the cycle Tc of the detection signal of the main rotor is 120 degrees, and the cycle Tm of the detection signal of the sub-rotor is 130 degrees.

4. The rotation sensor according to claim 1, wherein the cycle Tc of the detection signal of the main rotor is 120 degrees, and the cycle Tm of the detection signal of the sub-rotor is 260 degrees.

5. The rotation sensor according to claim 1, wherein the Tx and Tc satisfy a relationship of Tx=Tc×n (n is a positive integer).

6. The rotation sensor according to claim 1, wherein the first detecting means comprises: an electroconductive sensing portion which integrally rotates with the main rotor and whose width varies along a circumferential direction; and an exciting coil which detects a rotation angle of the main rotor based on electromagnetic induction in cooperation with the sensing portion, and the second detecting means comprises a magnetic flux detection element which detects a change in a magnetic flux of a magnet associated with rotation of the sub-rotor, the magnet being provided to the sub-rotor.

7. The rotation sensor according to claim 6, wherein the exciting coil is held by a core main body formed of a mixed soft magnetic material obtained by mixing Mn-Zn-based soft magnetic material ferrite in polyphenylene sulfide.

8. The rotation sensor according to claim 6, wherein the exciting coil is held by a core main body formed of a mixed soft magnetic material obtained by mixing Fe—Si—Al-based Sendust in an epoxy resin.

* * * * *